US009289719B2

(12) United States Patent
Riisager et al.

(10) Patent No.: US 9,289,719 B2
(45) Date of Patent: Mar. 22, 2016

(54) ABSORPTION AND OXIDATION OF NO IN IONIC LIQUIDS

(71) Applicant: Danmarks Tekniske Universitet, Kgs. Lyngby (DK)

(72) Inventors: Anders Riisager, Taastrup (DK); Andreas J. Kunov-Kruse, Cambridge, MA (US); Susanne L. Mossin, København K (DK); Rasmus Fehrmann, København Ø (DK)

(73) Assignee: Danmarks Tekniske Universitet, Kgs. Lyngby (DK)

( * ) Notice: Subject to any disclaimer, the term of this patent is extended or adjusted under 35 U.S.C. 154(b) by 21 days.

(21) Appl. No.: 14/361,642

(22) PCT Filed: Nov. 29, 2012

(86) PCT No.: PCT/EP2012/073969
§ 371 (c)(1),
(2) Date: May 29, 2014

(87) PCT Pub. No.: WO2013/079597
PCT Pub. Date: Jun. 6, 2013

(65) Prior Publication Data
US 2015/0037232 A1 Feb. 5, 2015

Related U.S. Application Data

(60) Provisional application No. 61/564,428, filed on Nov. 29, 2011.

(30) Foreign Application Priority Data

Nov. 29, 2011 (EP) .................................... 11191127

(51) Int. Cl.
*B01D 53/56* (2006.01)
*C01B 21/38* (2006.01)
*B01D 53/14* (2006.01)

(52) U.S. Cl.
CPC .......... *B01D 53/565* (2013.01); *B01D 53/1456* (2013.01); *B01D 53/1493* (2013.01); *B01D 53/56* (2013.01); *B01D 2251/102* (2013.01); *B01D 2252/30* (2013.01); *B01D 2257/404* (2013.01)

(58) Field of Classification Search
CPC ............... B01D 53/56; B01D 53/1456; B01D 53/1493; B01D 2252/30; B01D 2257/404
See application file for complete search history.

(56) References Cited

U.S. PATENT DOCUMENTS 6,235,248 B1 5/2001 Buisman et al.
8,603,422 B2 * 12/2013 Maruyama et al. ........... 423/212

2009/0291872 A1 11/2009 Bara et al.
2011/0065950 A1 3/2011 Riisager et al.
2011/0247494 A1 10/2011 Dinnage et al.

FOREIGN PATENT DOCUMENTS

| CN | 1317363 A | 10/2001 |
|---|---|---|
| CN | 101189052 A | 5/2008 |
| CN | 101837233 A | 9/2010 |
| WO | 2006110450 A1 | 10/2006 |
| WO | 2007/101397 A1 | 9/2007 |
| WO | 2011/011830 A1 | 2/2011 |
| WO | 2011/056895 A1 | 5/2011 |

OTHER PUBLICATIONS

Anderson et al., "Solubility of CO2, CH4, C2H6, C2H4, O2, and N2 in 1-Hexyl-3-Methylpyridinium Bis(Trifluoromethylsulfonyl)Imide: Comparison to Other Ionic Liquids", Accounts of Chemical Research, vol. 40, No. 11, 2007, pp. 1208-1216.
Anthony et al., "Anion Effects on Gas Solubility in Ionic Liquids", The Journal of Physical Chemistry B, vol. 109, No. 13, 2005, pp. 6366-6374.
Anthony et al., "Solubilities and Thermodynamic Properties of Gases in the Ionic Liquid 1-n-Butyl-3-Methylimidazolium Hexafluorophosphate", The Journal of Physical Chemistry B, vol. 106, No. 29, 2002, pp. 7315-7320.
Anthony et al., "Solution Thermodynamics of Imidazolium-Based Ionic Liquids and Water", The Journal of Physical Chemistry B, vol. 105, No. 44, 2001, pp. 10942-10949.
Bosch et al., "Formation and Control of Nitrogen Oxides", Catalysis Today, vol. 2, 1988, pp. 369-379.
Busca et al., "Catalytic Abatement of NOx: Chemical and Mechanistic Aspects", Catalysis Today, vol. 107-108, 2005, pp. 139-148.
Dalton et al., "Photocatalytic Oxidation of NOx Gases Using TiO2: A Surface Spectroscopic Approach", Environmental Pollution, vol. 120, 2002, pp. 415-422.
Fino et al., "A Multifunctional Filter for the Simultaneous Removal of Fly-Ash and NOx from Incinerator Flue Gases", Chemical Engineering Science, vol. 59, 2004, pp. 5329-5336.
Gambardella et al., "Experimental and Modeling Studies on the Absorption of NO in Aqueous Ferrous EDTA Solutions", Industrial & Engineering Chemistry Research, vol. 44, No. 12, 2005, pp. 4234-4242.
Huang et al., "Tuning Ionic Liquids for High Gas Solubility and Reversible Gas Sorption", Journal of Molecular Catalysis A: Chemical, vol. 279, 2008, pp. 170-176.
Latta et al., "Methods for Reducing NOx Emissions", Plant Engineering, Sep. 1998, pp. 105-110.
Löffler et al., "NOx Formation in Natural Gas Combustion—A New Simplified Reaction Scheme for CFD Calculations", Fuel, vol. 85, 2006, pp. 513-523.
Long et al., "Removal of Nitric Oxide and Sulfur Dioxide from Flue Gas Using a Hexamminecobalt(II)/Iodide Solution", Industrial & Engineering Chemistry Research, vol. 43, No. 15, 2004, pp. 4048-4053.

(Continued)

*Primary Examiner* — Timothy Vanoy
(74) *Attorney, Agent, or Firm* — Morrison & Foerster LLP

(57) ABSTRACT

The present invention concerns the absorption and in situ oxidation of nitric oxide (NO) in the presence of water and oxygen in ionic liquid compositions at ambient temperature.

19 Claims, 38 Drawing Sheets

(56) References Cited

OTHER PUBLICATIONS

Figure 1:
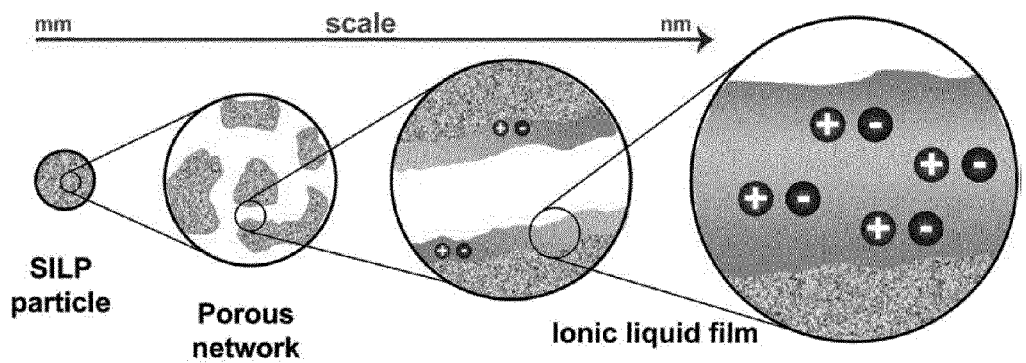

Roncaroli et al., "New Features in the Redox Coordination Chemistry of Metal Nitrosyls {M—NO+; M—NOradical dot; M—NO—{HNO)}}", Coordination Chemistry Reviews, vol. 251, 2007, pp. 1903-1930.

Topsoe et al., "Vanadiairitania Catalysts for Selective Catalytic Reduction of Nitric-Oxide by Ammonia", Journal of Catalysis, vol. 151, 1995, pp. 241-252.

Van Ormelingen et al., "Experience from Erection and Operation of Two SCR Denitrification Units at Electrabel's Langerlo Power Station, Genk, Belgium", Combined Power Plant Air Pollutant Control MEGA Symposium, 2003, pp. 1-27.

Yang et al., "Aqueous Absorption of Nitric Oxide Induced by Sodium Chlorite Oxidation in the Presence of Sulfur Dioxide", Environmental Progress, vol. 17, No. 2, 1998, pp. 80-85.

Office Action received for Chinese Patent Application No. 201280068453.7, mailed on Jun. 2, 2015, 5 pages (5 pages of English Translation only).

Ormelingen et al., "Experience from Erection and Operation of two SCR Denitrification units at Electrabel's Langerlo Power Station, Genk, Belgium", Combined Power Plant Air Pollutant Control Mega Symposium, May 19-22, 2003, pp. 1-30.

\* cited by examiner

Imidazolium ion

Ammonium ion

Guanidinium ion

Sulfonium ion

Phosphonium ion

R1, R2, R3, R4, R5, R6, R7, R8, R9, R10, R11, R12, R13, R14, R15, R16, R17, R18, R19, R20, R21 and R22 can be, independently, hydrogen, alkyl, halogenated alkyl, aminoalkyl, hydroxyalkyl, alkoxyalkyl, alkenyl, alkynyl, aryl, heteroaryl, cycloalkyl, cycloalkenyl, heterocycloalkyl, or heterocycloalkenyl;

ABSORPTION AND OXIDATION OF NO IN IONIC LIQUIDS

CROSS REFERENCE TO RELATED APPLICATIONS

This application is a 35 U.S.C. 371 National Phase patent application of PCT/EP2012/073969, filed on Nov. 29, 2012, which claims priority to U.S. Patent Application No. 61/564,428, filed on Nov. 29, 2011, and European Patent Application No. 11191127.7, filed on Nov. 29, 2011, each of which is hereby incorporated by reference in the present disclosure in its entirety.

FIELD OF THE INVENTION

The present invention concerns the absorption and in situ oxidation of nitric oxide (NO) in the presence of water and oxygen in ionic liquid compositions at ambient temperature.

BACKGROUND OF THE INVENTION

Origin of NO

NOx is a generic term for the various nitrogen oxides produced during combustion. Nitrogen oxides are believed to aggravate asthmatic conditions, react with the oxygen in the air to produce ozone, which is also an irritant, and eventually form nitric acid when dissolved in water. When dissolved in atmospheric moisture the result can be acid rain which can damage both trees and entire forest ecosystems. Consequently, the sources of $NO_x$ emissions are now being subjected to more stringent standards. In atmospheric chemistry the term $NO_x$ means the total concentration of NO, $NO_2$, $N_2O$, $N_2O_3$ and $N_2O_5$.

Nitrogen oxides can be formed during the combustion of nitrogen precursors in the fuel, defined as fuel $NO_x$, but also from the nitrogen in the air via two mechanisms, one designated as thermal $NO_x$, via the Zeldovich mechanism:

$$O+N_2 \rightarrow NO+N \qquad (1.1)$$

$$N+O_2 \rightarrow NO+O \qquad (1.2)$$

$$N+OH \rightarrow NO+H \qquad (1.3)$$

The other is designated as prompt $NO_x$, where the nitrogen in air is fixed by hydrocarbon radicals and subsequently oxidized to $NO_x$ [G. Löffler et al. *Fuel*, vol. 85, pp. 513-523, 2006]:

$$N_2+CH \rightarrow HCN+N \qquad (1.4)$$

Three primary sources of $NO_x$ formation in combustion processes are documented: Prompt $NO_x$, fuel $NO_x$ and thermal $NO_x$ [C. S. Latta *Plant Engineering*, vol. 52 (10), pp. 105-110, 1998]. Thermal $NO_x$ formation, which is highly temperature dependent, is recognized as the most relevant source when combusting natural gas. Due to the break-up of the nitrogen triple bond (i.e. reaction (1.1)), thermal $NO_x$ is primarily produced at high temperatures, usually above 1200° C. [H. Bosch et al. *Catal. Today*, vol. 46, pp. 233-532, 1988].

From a thermodynamic point of view, the reaction $N_2+O_2 \rightarrow 2NO$ is very unfavoured with an enthalpy of $\Delta H°_{298\,K}$=−452 kJ [G. Busca et al. *Catal. Today*, vol. 107-108, pp. 139-148, 2005]. Therefore it requires very high temperatures to proceed at a reasonable rate. From a pure chemical equilibrium observation, it is obvious that the formation of the various nitrogen compounds, $N_2$, $N_2O$, NO or $NO_2$, is proportional with the oxygen partial pressure, due to the increasing O/N ratio.

Another source of $NO_x$ production from nitrogen containing fuels, such as certain coals and oil, is the conversion of fuel bound nitrogen to $NO_x$ during combustion. The nitrogen bound in the fuel is here released as a free radical and ultimately forms free $N_2$ or NO, through the following reaction [G. Busca et al.]:

$$4NH_3+5O_2 \rightarrow 4NO+6H_2O \qquad (1.5)$$

where the nitrogen containing compounds, like ammonia and amines, are oxidized to NO. The reaction is thermodynamically highly favoured, with an enthalpy at $\Delta H°_{298\,K}$=−452 kJ; although less favoured than the oxidation to $N_2$. The amount of formed 'fuel $NO_x$' primarily depends on the amount of nitrogen in the fuel, and also strongly influenced by the reactor design. In natural gas (methane), nitrogen compounds are virtually absent, but substantial amounts of nitrogen is present in the case of coal, gas oils and fuel oils as well as biofuels, such as wood [Busca].

Prompt $NO_x$ is generated when the fuel-to-air ratio is high where nitrogen radicals formed in reaction (1.4) react with oxygen via reaction (1.2). The reactions are almost non-temperature dependent, but the prompt $NO_x$ formed is negligible relative to thermal $NO_x$.

Methods of Nitrogen Oxides Removal

The numerous possibilities to reduce $NO_x$ can be divided into three categories: Precombustion, combustion modifications and post combustion [Latta]. The precombustion strategy imply using alternative fuels with a lower content of nitrogen species [Busca]. During combustion different types of modifications can be utilized, of which the most used are: Low $NO_x$-burners, reburning and staged air combustion (thermal oxidation) [Latta]. A variety of other methods is also possible in the combustion modification: Burners out-of-service, derating, burner system modification, trim and diluent injection; all described by Latta. Several post-combustion approaches are applied to reduce $NO_x$: SCR, selective non-catalytic reduction (SNCR), adsorption, $NO_x$ recycle, direct decomposition [Latta], photocatalytic oxidation [J. Dalton, et al *Environmental Pollution*, vol. 120, pp. 415-422, 2002], multifunctional filter (removal of fly-ash and $NO_x$) [D. Fino et al. *Chem. Eng. Sci.*, vol. 59, pp. 5329-5336, 2004] and pulse intense electron beam irradiation.

One of the most widespread technologies for removing NOx from flue gases is the selective catalytic reduction (SCR) process employed in stationary sources or power plants due to its efficiency and economy. The SCR process for removing nitrogen oxides is based on the reaction between NOx and ammonia:

$$4NO+4NH_3+O_2 \rightarrow 4N_2+6H_2O \qquad (1.6)$$

$$NO+NO_2+2NH_3 \rightarrow 2N_2+3H_2O \qquad (1.7)$$

In a typical application, ammonia is injected into the NOx-containing gas and the mixture is passed through a flow distribution system and one or several catalyst layers. The main components of an SCR DeNOx system include a reactor with catalyst and an ammonia storage and injection system.

Many different supports and catalytic metals are utilized for the SCR process, but the vanadia/titania catalyst is traditionally applied because of its thermal stability and resistance towards sulfur poisoning [N. Topsoe et al *J. Catal.*, vol. 151, pp. 226-240, 1995.].

The ammonia source can be either anhydrous ammonia, ammonia water or a solution of urea. Because of its better performance ammonia is often utilized, but due its poisonous character and difficult handling, urea can be used, although not quite as effectively as ammonia.

The ammonia is evaporated and subsequently diluted with air or a flue gas side stream before it is injected into the flue gas duct upstream the SCR reactor. Direct injection of ammonia water or a urea solution is also possible. The SCR process requires precise control of the ammonia injection rate and a homogeneous mixing into the flue gas to ensure efficient NOx conversion without an undesirable release of unconverted ammonia referred to as ammonia slip. The SCR process typically requires a temperature of about 350-400° C.

Urea is often used in mobile units, where e.g. the ammonia slip would be avoided. Besides urea as an alternative to ammonia in the SCR process, it is also possible to use hydrocarbons. The possibility for reducing NO with hydrocarbons such as olefins and higher alkanes was first proposed in 1990 [Busca]. Hydrocarbon-SCR systems use hydrocarbons as the reductant. The hydrocarbon may be present in the exhaust gas or it may be added to the exhaust gas. This has the advantage that no additional reductant source (e.g. urea) needs to be carried on-board, but these systems cannot offer the performance of ammonia-SCR systems. In stationary plants, methane is the preferred choice for $NO_x$ removal from flue gases from power stations because it is already present, at least in methane (natural gas)-fueled plants.

Although the catalytic removal of $NO_x$ (nitrogen oxides, covering NO, $N_2O$, $NO_2$) from the flue gas is a very effective process, the overall high operating expenses of the SCR process and possibility of ammonia slip have motivated a search for other methods to abate emissions of nitrogen oxides.

A different concept is presented by wet scrubbing systems for removal of $SO_2$ and $NO_x$. Some aqueous scrubbing systems have been developed for the simultaneous removal of $NO_x$ and $SO_2$ [C.-L. Yang et al. *Environmental Progress*, 17, 80-85 (1998)].

The wet flue gas desulfurization (FGD) typically exhibits high $SO_2$ removal efficiencies, but the FGD can only remove a small amount of $NO_x$ because about 90-95% in a typical flue gas is present as insoluble NO and only the remaining 5-10% $NO_2$ is water soluble. Attempts to oxidize NO to water soluble $NO_2$ have been made by adding strong oxidizing additives, such as $MnO_4^-$ and $H_2O_2$, but the treatment cost involved herein has been too high for practical utilization.

Promising results of the simultaneous NO and $SO_2$ removal in a $[Co(NH_3)_6]^{2+}$ solution, which operates below 80° C., have been reported by Long et al. [X.-I. Long et al., *Industrial & Engineering Chemistry Research*, 43, 4048-4053 (2004)].

Another approach for removing NO is the complexation of NO with $Fe^{2+}$-chelates based on ethylenediaminetetraacetic acid (EDTA) or nitrilotriacetate (NTA), as outlined in reaction 1.8 for the case of iron-EDTA complex [F. Ron-caroli et al., *Coordination Chemistry Reviews*, 251, 1903-1930 (2007)].

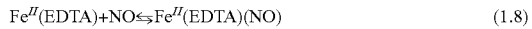

$$Fe^{II}(EDTA)+NO \leftrightharpoons Fe^{II}(EDTA)(NO) \quad (1.8)$$

The metal-chelate can be electrochemically regenerated after absorption or reduced by sulfite ions to sulfate and nitrogen [F. Gambardella et al., *Industrial & Engineering Chemistry Research* 44, 4234-4242 (2005)].

In U.S. Pat. No. 6,235,248 a biotechnological approach to regenerate the iron-complex, the so-called $BioDeNO_x$ process was described. In this process the NO-saturated iron-chelate solution is brought in close contact with bacteria that regenerate the iron-EDTA complex and convert the bound nitrosyl to $N_2$. The $Fe^{II}(EDTA)$ solution needs to be somewhat diluted (concentration <200 mM) due to the presence of microorganisms, which naturally limits the absorption capacity.

The above proposed technologies for NO removal are all associated with various challenges such as: low capacity, large installation footprint, poor reaction kinetics, hazardous stoichiometric reductants or oxidants, elevated reaction temperatures and the requirement for specialized catalysts.

Many of the above proposed technologies are further based on liquids with a vapour pressure, which means that the solvent to some extent vaporizes during operation. One promising solution to this particular problem could be the use of a relatively new class of solvents referred to as ionic liquids (ILs). The expression 'ionic liquid' in principle encompasses any liquid entirely composed of ions (e.g. molten salts). However, within the context of this work the term will only be used to describe materials which are liquid in their pure state at room temperature. This class of solvents is often considered as 'green' solvents because of their immeasurably low vapour pressure. This feature gives the ILs an essential advantage over traditional solvents used for absorbing gases. Ionic liquids have already demonstrated promising behaviour in a number of reactions where gaseous reactants enter the IL solution (such as hydrogenation, hydroformylation, and oxidations) despite low gas solubilities of the gases in the IL at ambient conditions [J. L. Anthony et al. *The Journal of Physical Chemistry B*, 106. 7315-7320 (2002)].

Another known application of ILs is to utilize them to separate gas mixtures. Patent application WO 2007/101397 comprises gas purification processes and mentions a broad range of ionic liquids as possible absorbers of many different gasses, but does not provide any experimental evidence supporting these propositions. WO 2007/101397 is merely a theoretical review since there is no data evidencing how the ionic liquids work. Recently, a promising solid ionic cation (1,1,3,3-tetramethylguanidinium) has been identified for the absorption of $SO_2$ [J. Huang et al., *Journal of Molecular Catalysis A: Chemical*, 279, 170-176 (2008)]. Anthony et al. [J. L. Anthony et al., *The Journal of Physical Chemistry B*, 106, 7315-7320 (2002)] reported of the solubilities of a number of gases (such as $CO_2$, CO, $O_2$) in imidazolium-based ILs.

Ionic liquids tend to be more viscous compared to conventional solvents, however, which can result in challenges regarding the mass transfer of gas into the IL. In the case of low-soluble gases, the mass transfer into the IL will likely be a rate limiting step, which can be minimized by increasing the interfacial gas-IL area and/or use high pressure systems [J. L. Anthony et al., *The Journal of Physical Chemistry B*, 106, 7315-7320 (2002)].

So far, only limited information regarding the gas solubilities in ILs has been reported. Besides the reports regarding $CO_2$ capture, the focus of most work revolves around the reactions taking place in the IL with the gas already absorbed. Only few reports exist on gas solubilities [J. L. Anthony et al., *The Journal of Physical Chemistry B*, 106, 7315-7320 (2002); J. L. Anderson et al., *Accounts of Chemical Research*, 40, 1208-1216 (2007)]. The Brennecke group has, e.g. contributed with a number of seminal studies on absorption of a number of gases in imidazolium-based ILs [J. L. Anthony et al., *The Journal of Physical Chemistry B*, 106, 7315-7320 (2002); J. L. Anderson et al., *Accounts of Chemical Research*, 40, 1208-1216 (2007); J. L. Anthony et al., *The Journal of Physical Chemistry B*, 105, 10942-10949 (2001); J. L. Anthony et al., *The Journal of Physical Chemistry B*, 109, 6366-6374 (2005)].

Consequently, there is still a need for developing efficient processes for removing NOx, and specifically the most abundant NOx component NO, from flue gasses from not only large stationary sources like power or incineration plants, but also from mobile emission sources like, e.g. commercial marine vessels which require a small installation footprint, low energy consumption and preferably no carrying of hazardous chemicals.

SUMMARY OF THE INVENTION

The original focus of the present work was on studying the selective absorption and desorption behaviour of nitric oxide (NO) in ILs based on N-heterocyclic cations capable of forming carbenes, e.g. the cations 1-ethyl-3-methylimidazolium ([EMIM]$^+$) and 1-butyl-3-methylimidazolium ([BMIM]$^+$) with different counterions (anions). This initial work is disclosed in PCT/EP2011/060064.

However, when the absorption phenomenon was closer investigated, it was surprisingly found that when the absorption of nitric oxide (NO) takes place in presence of atmospheric oxygen and small amounts of water, NO is not only absorbed in the IL but also converted very rapidly into nitric acid ($HNO_3$), requiring no further oxidant than the oxygen present in the gas stream and no further water than that present in the gas stream and/or present in trace amounts in the IL. The reaction runs surprisingly fast even at room temperature. Several other ionic compounds like 1,1,3,3-tetramethylguanidinium chloride ([TMGH]-Cl) and choline chloride could also be used, which meant that the original limitation to N-heterocyclic cations capable of forming carbenes was not relevant. NO is thus converted rapidly to $HNO_3$ in all the liquid ionic compositions tested, and some of these compositions additionally have a high capacity for storing the formed $HNO_3$ which under certain conditions is an added advantage. A storage capacity of around 1 mole $HNO_3$ per mole ionic compound was observed in most cases; however in some cases for very hydrophobic liquid ionic compositions the storage capacity was lower than 1 mole $HNO_3$ per mole ionic compound even though the reaction rate remained very high, and for other ionic compounds which contained additional structural elements suitable for complexation with $HNO_3$, a higher storage capacity was observed.

The present invention in a first aspect provides a method for capturing nitric oxide (NO) from gasses containing more than one gaseous compound, which method comprises:
a. absorbing said NO in a liquid ionic composition in the presence of oxygen and water,
b. reacting the absorbed NO with oxygen and water to form nitric acid which accumulates in the liquid ionic composition,
c. optionally removing the formed nitric acid from the liquid ionic composition solution by increasing the temperature and/or decreasing the pressure,
wherein said liquid ionic composition comprises one or more ionic compounds, optionally admixed with a non-ionic solvent.

The present invention in a second aspect provides a method for producing nitric acid ($HNO_3$) from nitric oxide (NO), which method comprises absorbing said nitric oxide (NO) in a liquid ionic composition in the presence of oxygen and water, whereby said nitric oxide (NO) is converted into nitric acid ($HNO_3$).

The present invention in a third aspect provides a method for the preparation of anhydrous solutions of nitric acid in a liquid ionic composition, which method comprises absorption of NO and/or $NO_2$ in said liquid ionic composition followed by conversion to $HNO_3$, according to the first or second aspect of the present invention.

The present invention in a fourth aspect provides the use of an ionic composition as defined in the present application for capturing nitric oxide (NO) from gasses containing more than one gaseous compound.

The present invention in a fifth aspect provides the use of an ionic composition as defined in the present application absorbed on a porous carrier and used in the form of a supported ionic liquid phase (SILP) material for capturing nitric oxide (NO) from gasses containing more than one gaseous compound.

FIGURES

FIG. 1: A sketch of the SILP concept.

Figure 2:
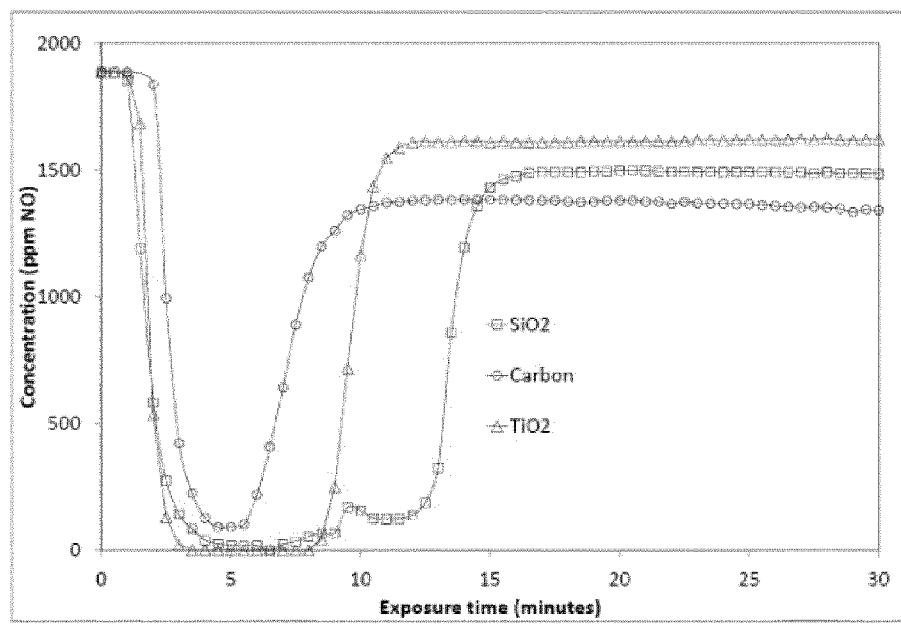

FIG. 2: A comparison of the data collected for the three studied supports, showing the development in NO concentration over the first 30 minutes of reaction, $SiO_2$ refers to the calcined silica SILP. The total amount of IL in each SILP was 1.5 g for $SiO_2$, 1 g for $TiO_2$ and 1.1 g for Carbon. All absorptions were conducted at 40 C, with a gas composition of 2000 vppm NO and 2000 vppm of water. For the carbon SILP, the flue gas was saturated with water.

Figure 3:
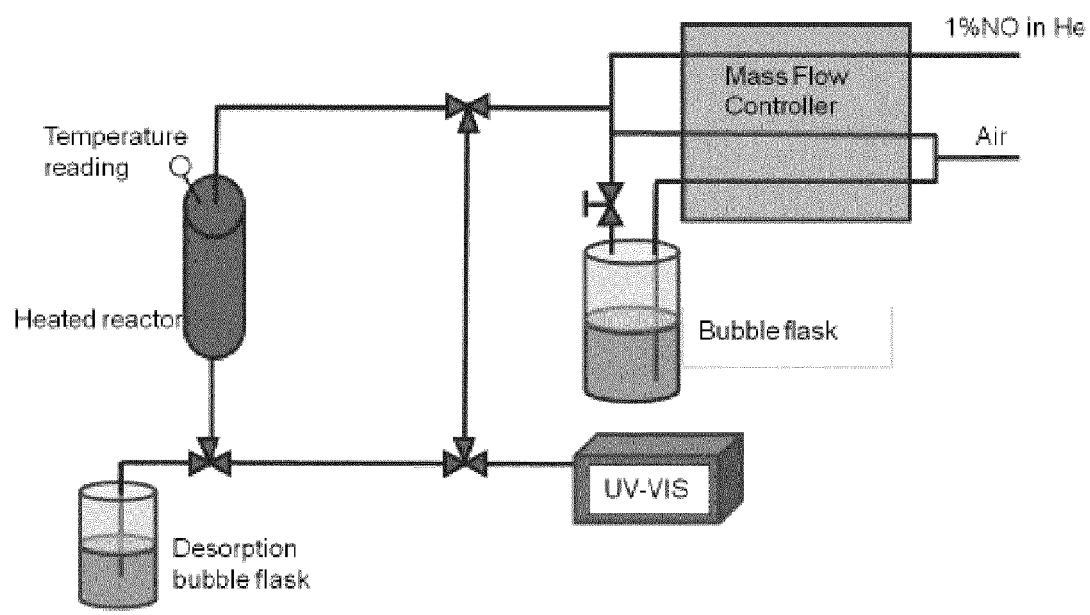

FIG. 3: An overview of the continuous flow setup used to test SILP material.

Figure 4:
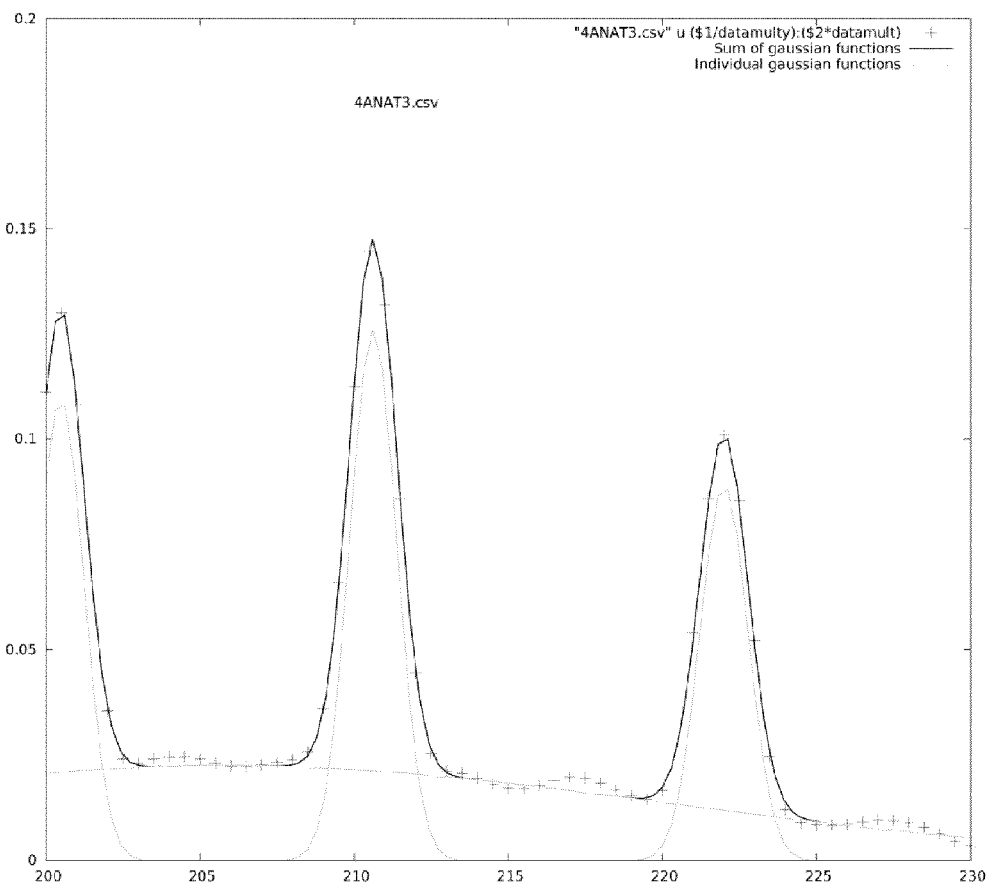

FIG. 4: Example of gas UV-spectrum (crosses) deconvoluted with Gaussian functions FIG. 5: An illustration of the setup used for measuring $NO_x$ absorption on the ATR-FTIR. The setup was used to pass simulated flue gas over a thin film of IL. The instrument is heatable, making it possible to vary the temperature for the measurements.

Figure 6:
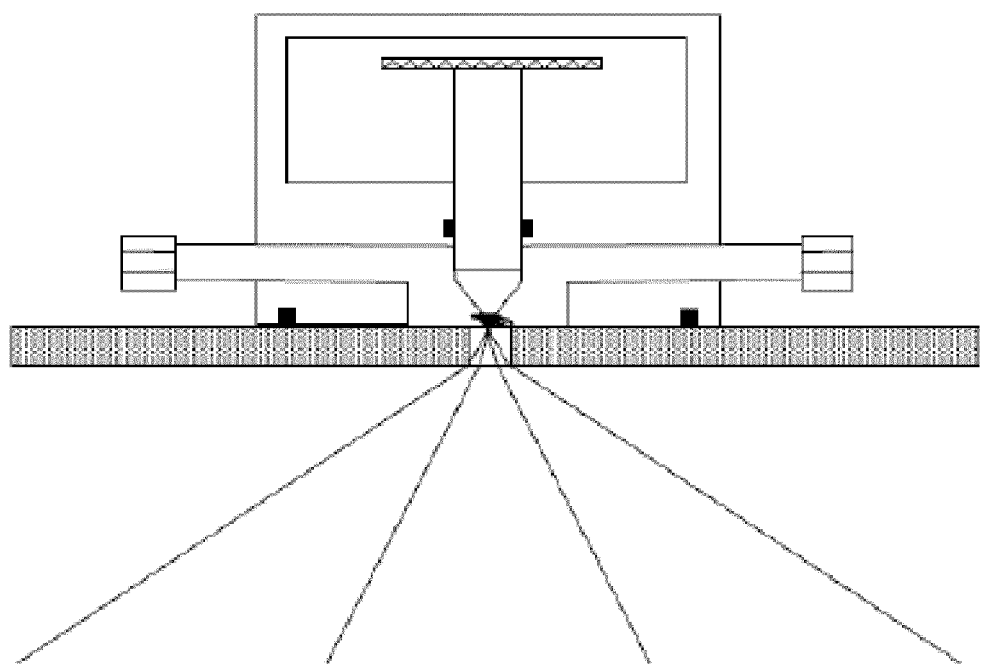

FIG. 6: An illustration of the setup that allows good contact between a solid SILP sample and the ATR crystal while controlling the environment around the sample. The set-up directly allows in-situ ATR-FTIR measurements on SILP systems.

Figure 7:
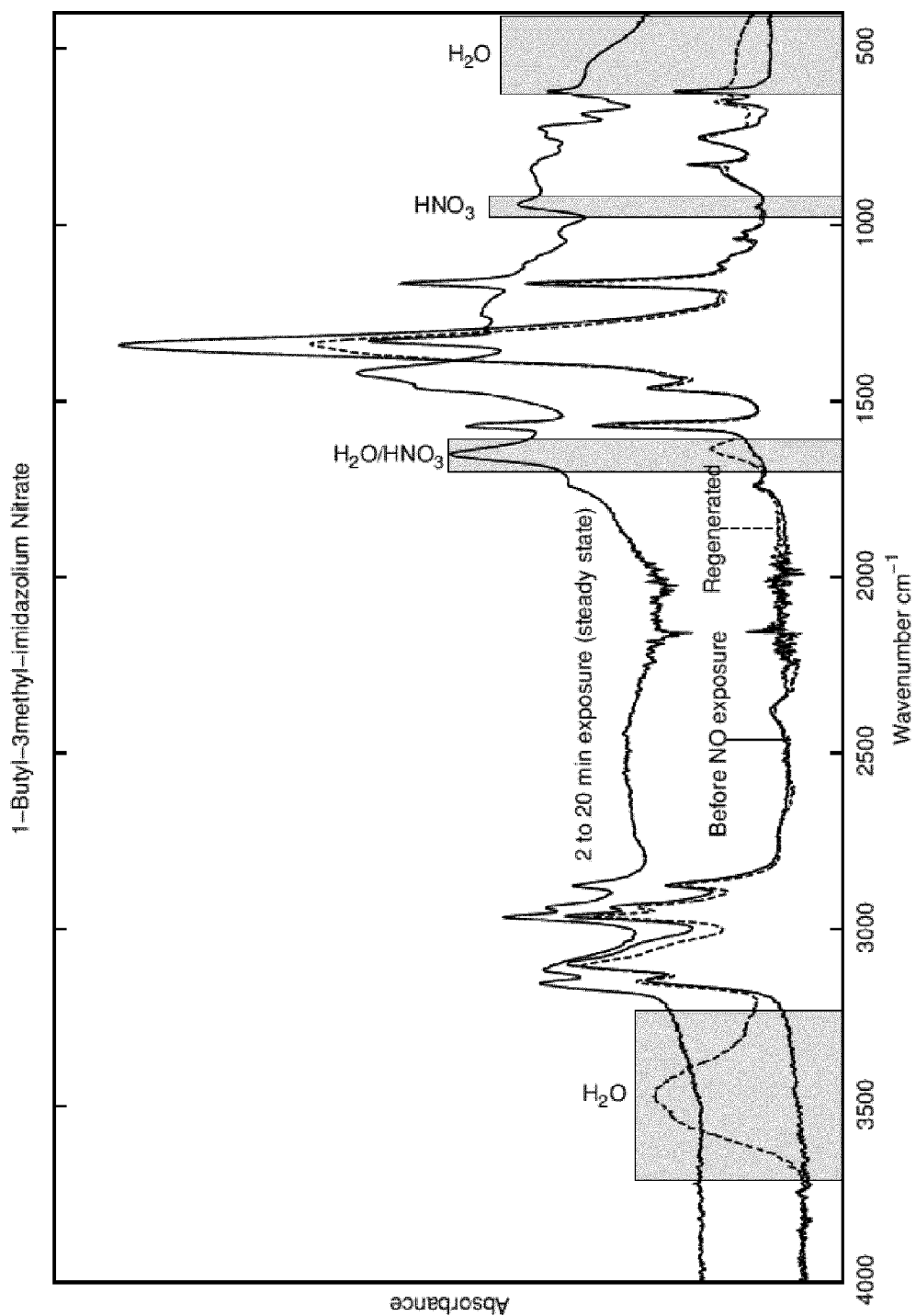

FIG. 7: ATR-FTIR spectra of [BMIM]$NO_3$ before and after reaction with a flow of 8 ml/min moist air (generated by bubbling through water) mixed with 10 vol % NO in nitrogen. After reaction the sample was heated to 120° C. under a flow of moist air until steady state was reached.

Figure 8:
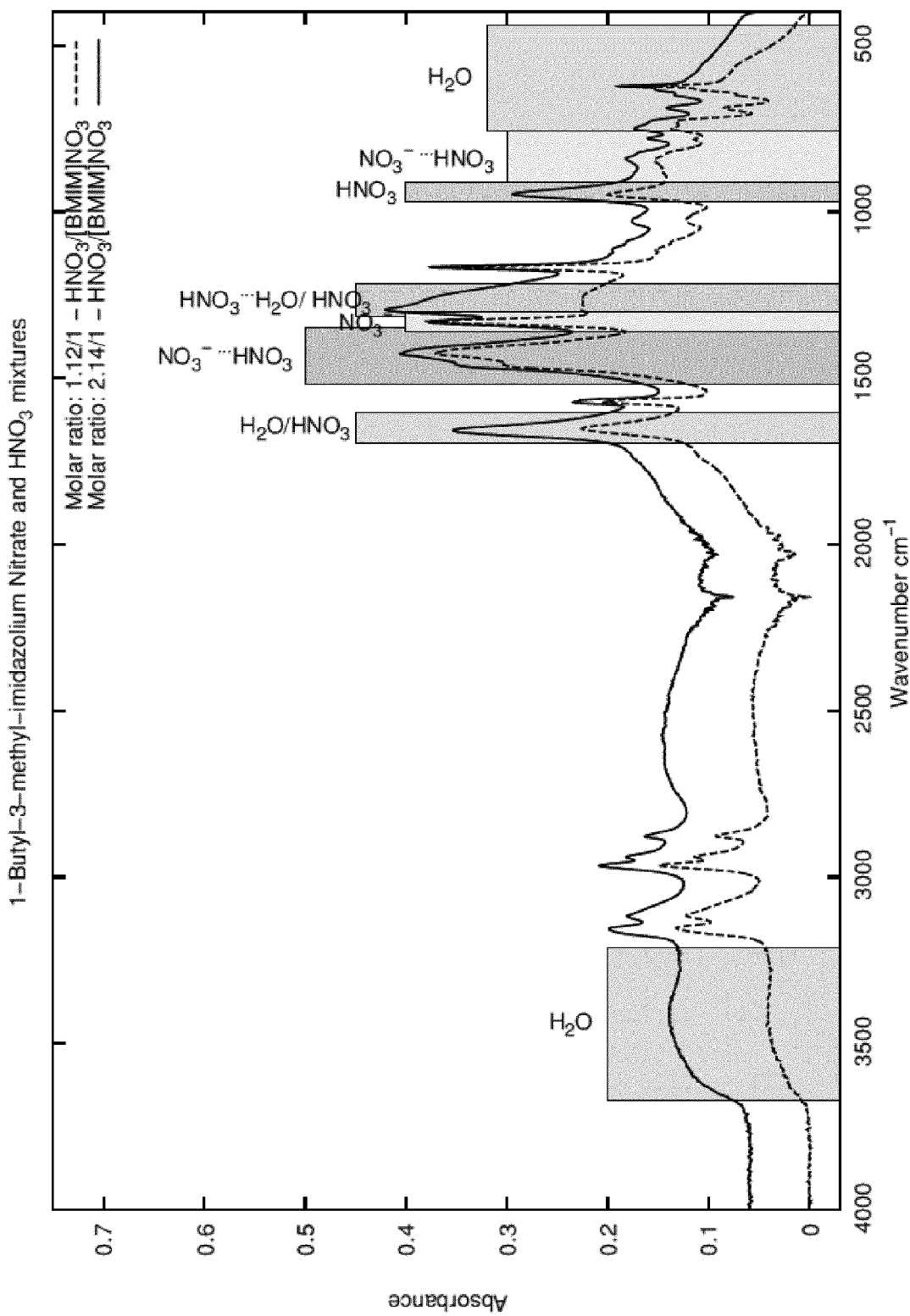

FIG. 8: Mixtures of nitric acid and [BMIM]$NO_3$ — 1.12 and 2.14 mol nitric acid per mol [BMIM]$NO_3$, respectively.

Figure 9:
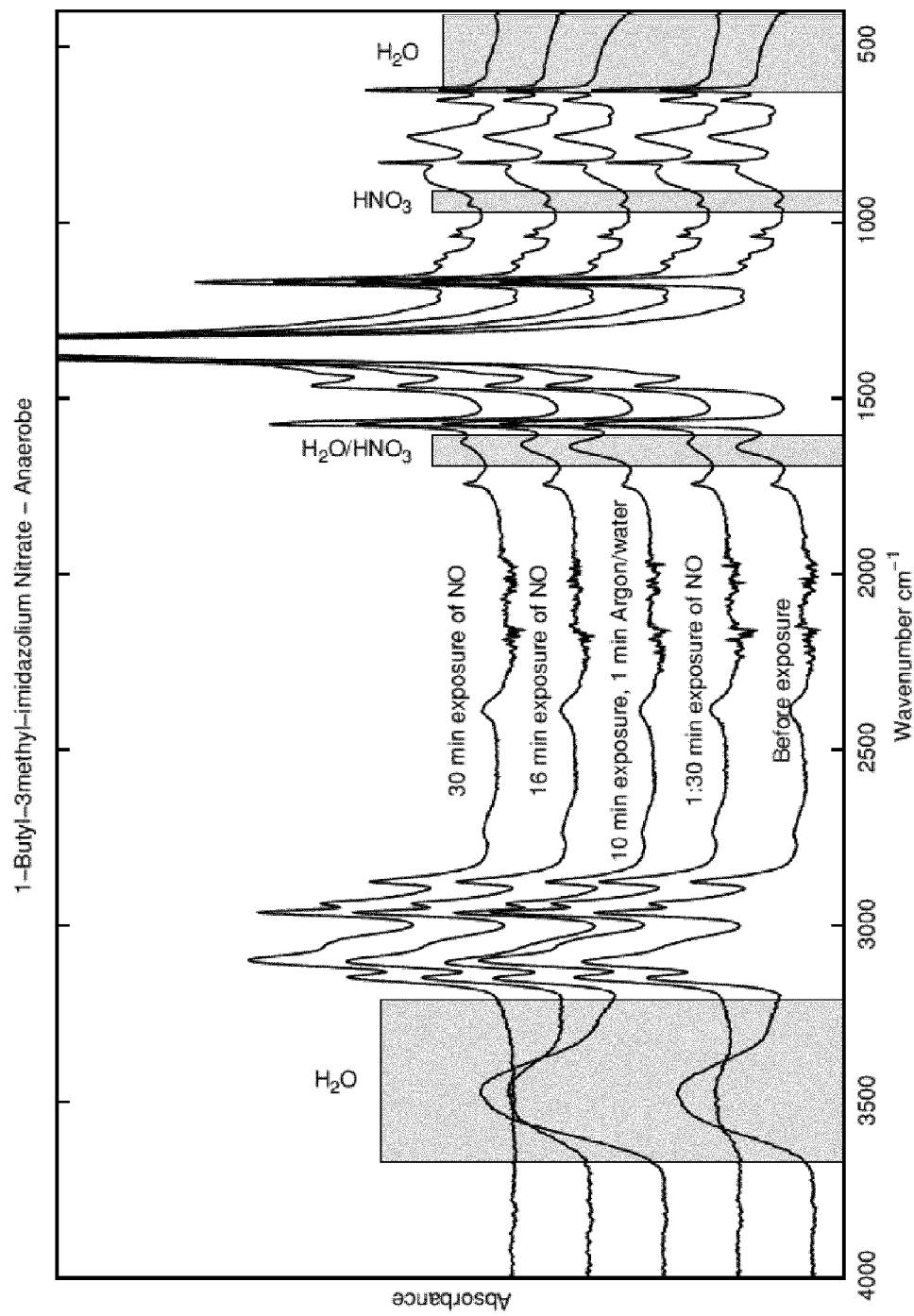

FIG. 9: [BMIM]$NO_3$ exposed to a stream of Argon saturated with water. The flow was then switched to 30 min 10 vol % NO in nitrogen. After 10 min the sample was re-saturated with water for 1 minute. Then the flow was changed back to 10 vol % NO in nitrogen for another 20 minutes.

Figure 10:
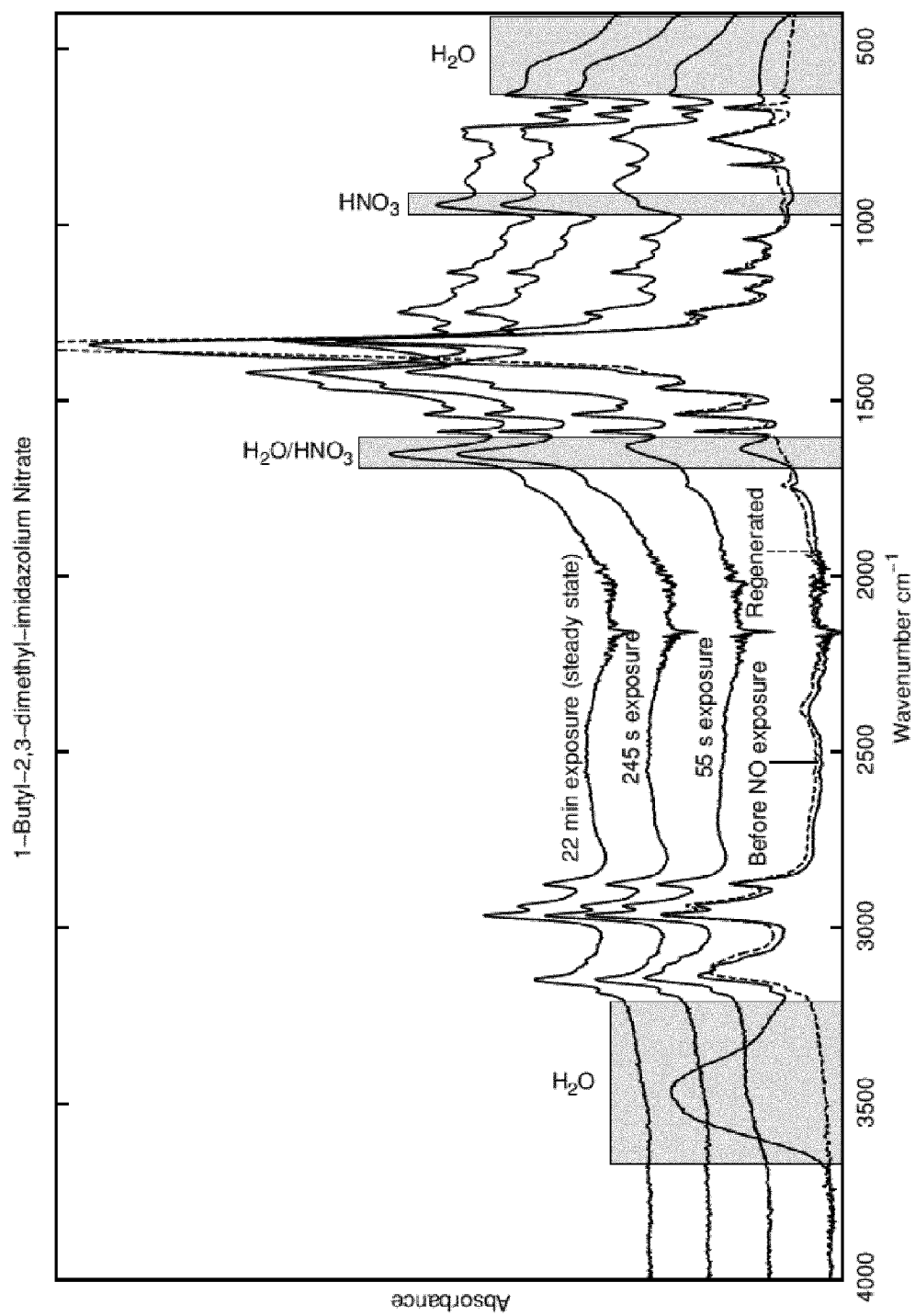

FIG. 10: Selected ATR-FTIR spectra of [BDMIM]$NO_3$ before and after reaction with a flow of 8 ml/min moist air (generated by bubbling through water) mixed with 16 mL/min 10% NO in nitrogen. After reaction the sample was heated to 120° C. under a flow of moist air until steady state was reached.

Figure 11:
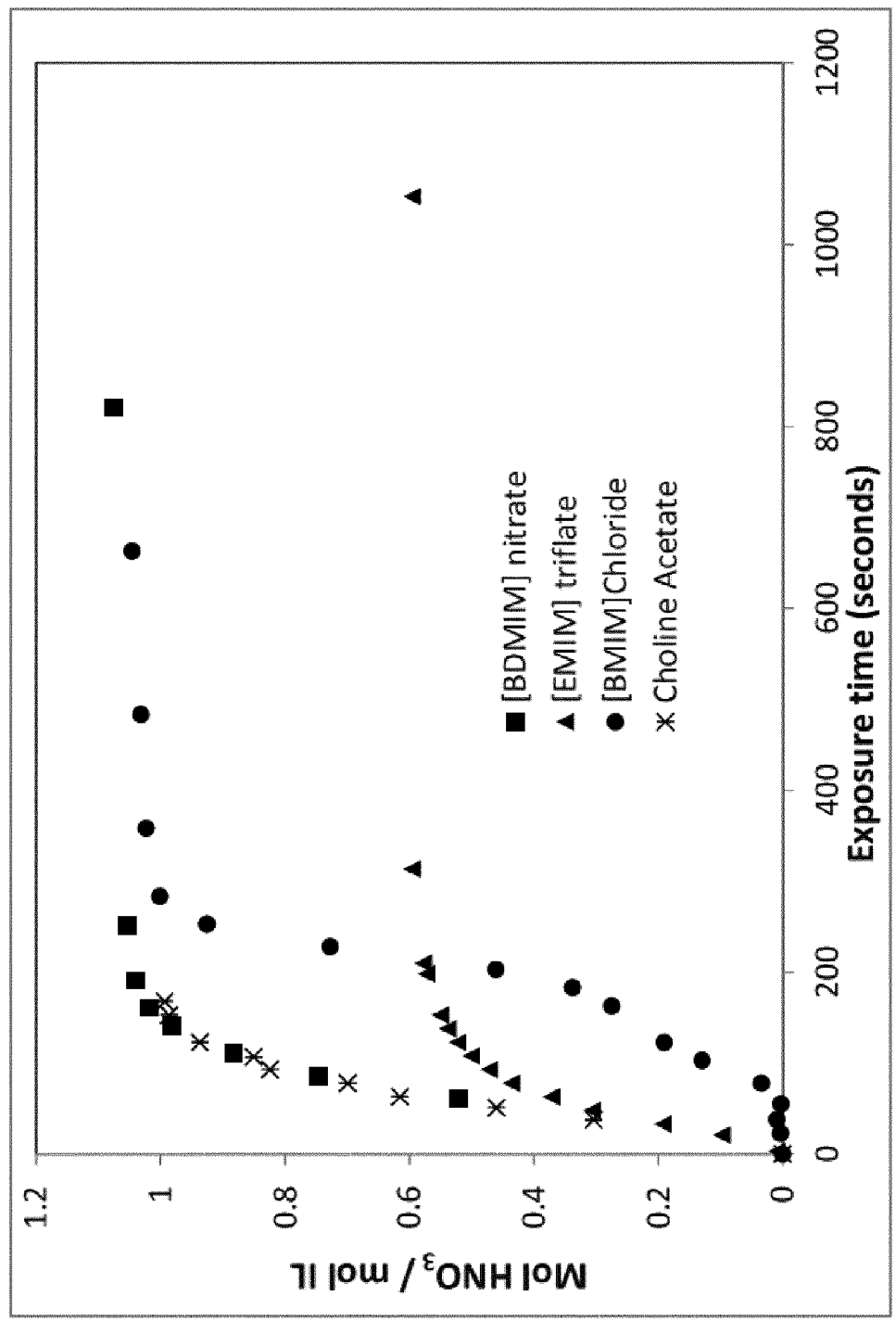

FIG. 11: Quantitative estimates of nitric acid evolution in 5 ionic liquids from deconvolution of ATR corrected spectra using the spectra in FIG. 2 as references. Values from experiments using [BDMIM]$NO_3$ and [BMIM] Cl were estimated from the peak around 940 cm$^{-1}$ using the raw ATR corrected spectra. For the reaction using [EMIM]OTf, the spectra of pure [EMIM]OTf was substracted. This reference was then further calibrated with the peak at around 1650-1665 cm$^{-1}$. In the experiments with choline acetate, the conversion of acetate to acetic acid was assessed using the peak at around 1570 cm$^{-1}$ (carboxylate C—O stretching).

Figure 12:
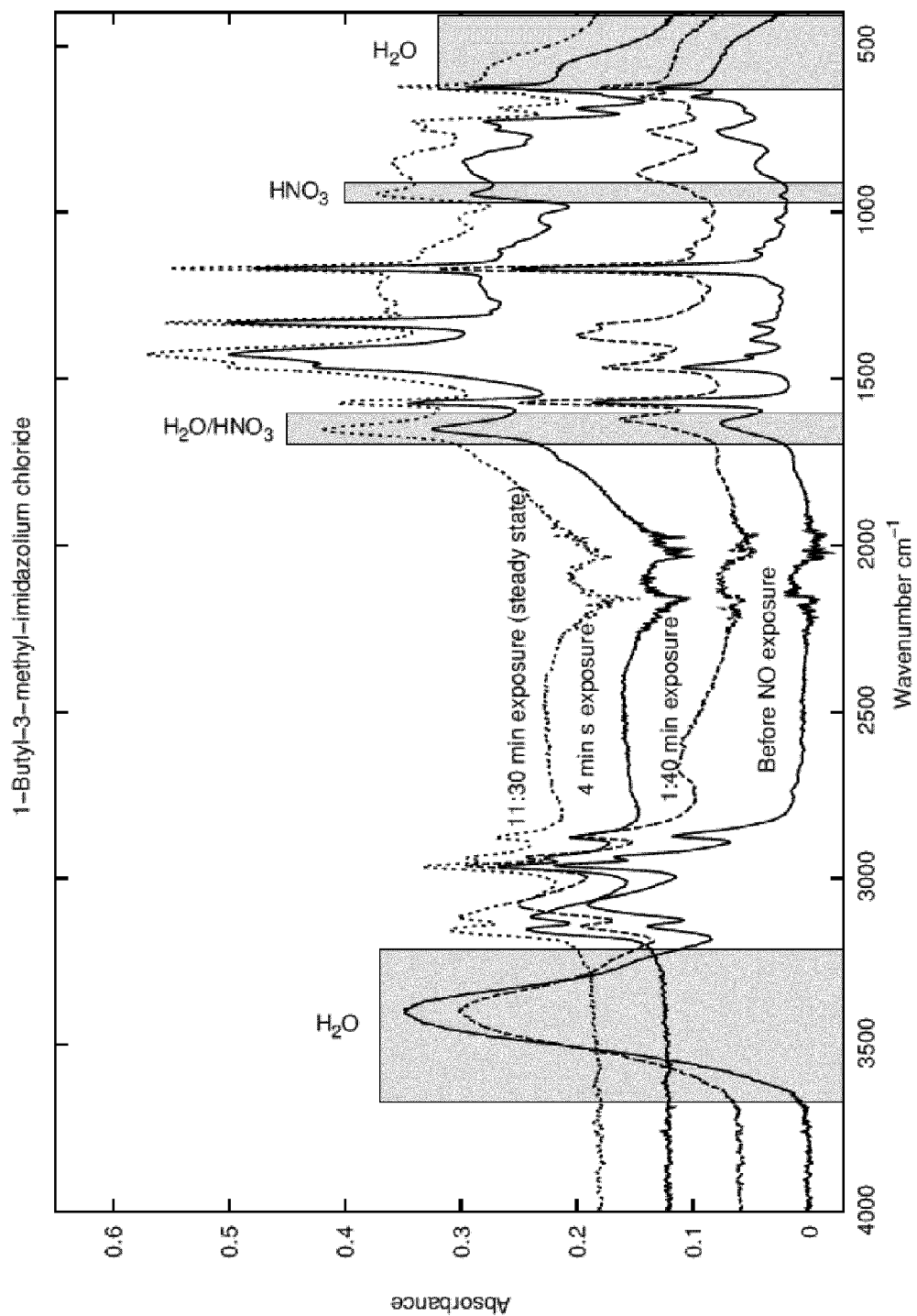

FIG. 12: Selected ATR-FTIR spectra of [BMIM]Cl before and after reaction with a flow of 8 ml/min moist air (generated by bubbling through water) mixed with 16 mL/min 10 vol % NO in nitrogen. After reaction the sample was heated to 120° C. under a flow of moist air until steady state was reached.

Figure 13:
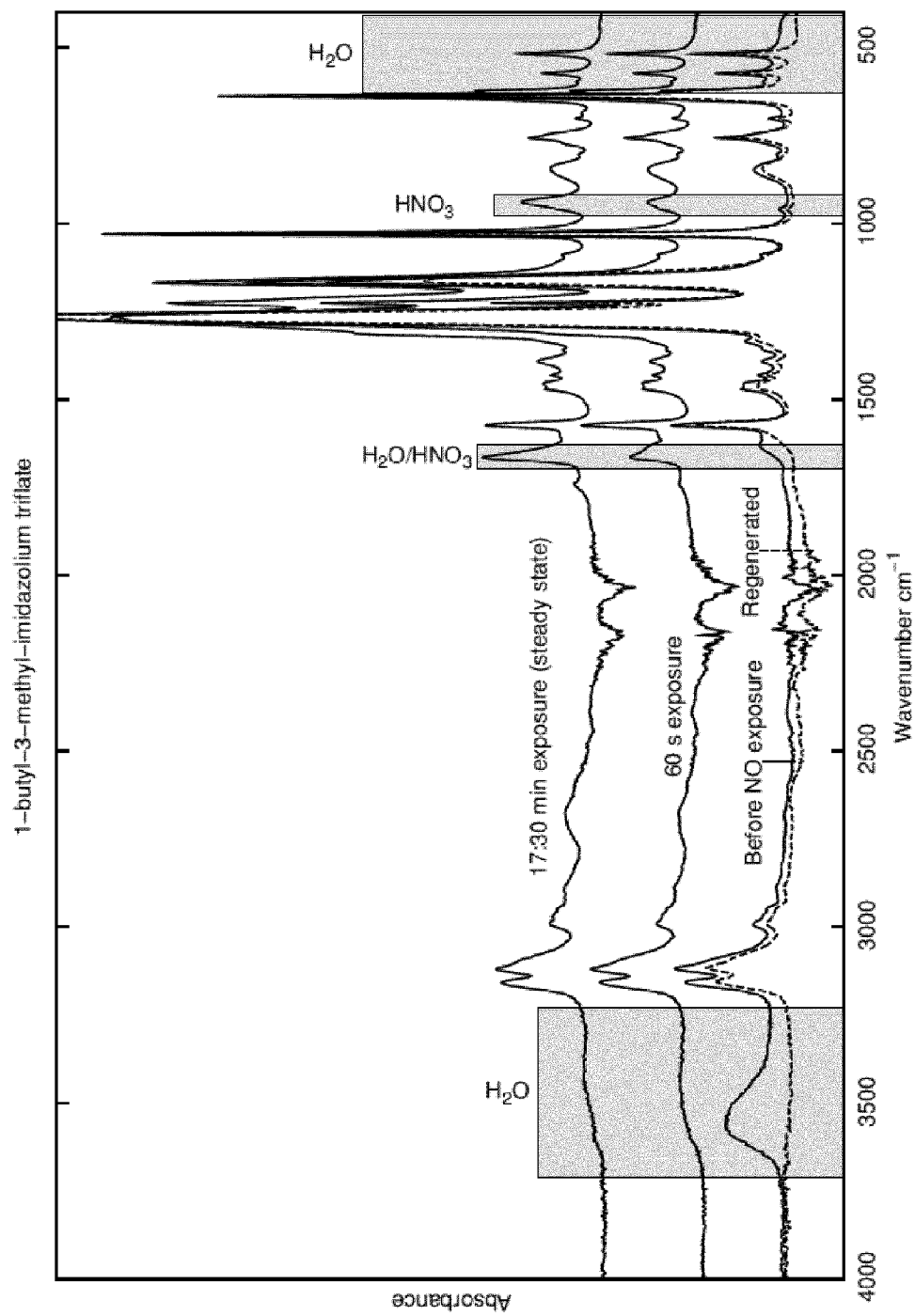

FIG. 13: Selected ATR-FTIR spectra of [EMIM]OTf before and after reaction with a flow of 8 ml/min moist air (generated by bubbling through water) mixed with 16 mL/min 10 vol % NO in nitrogen. After reaction the sample was heated to 120° C. under a flow of moist air until steady state was reached.

Figure 14:
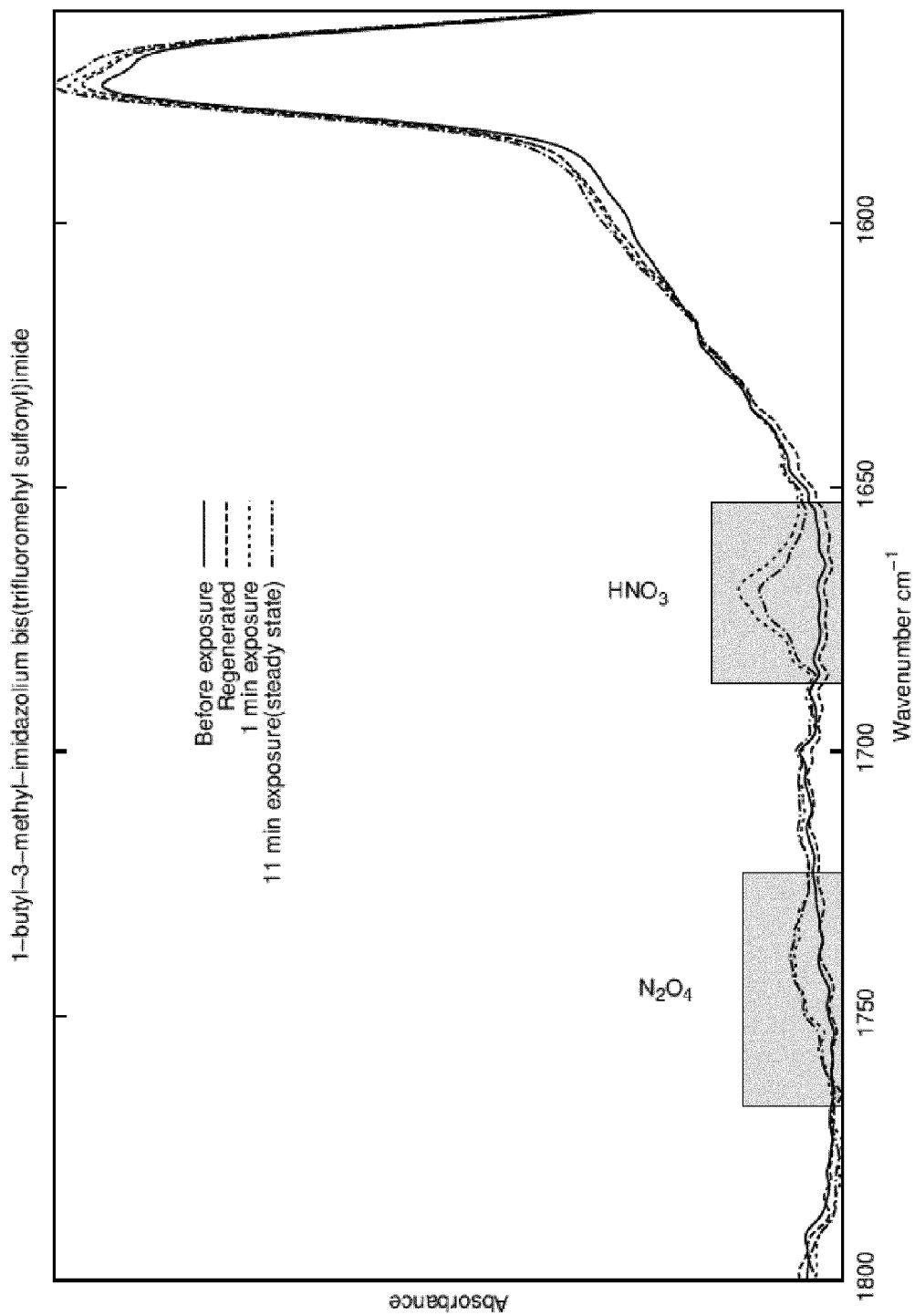

FIG. 14: Selected ATR-FTIR spectra of [BMIM]Tf$_2$N before and after reaction with a flow of 8 ml/min moist air (generated by bubbling through water) mixed with 16 mL/min 10 vol % NO in nitrogen. After reaction until steady state the sample was heated to 80° C. under flow of moist air until steady state was reached.

Figure 15:
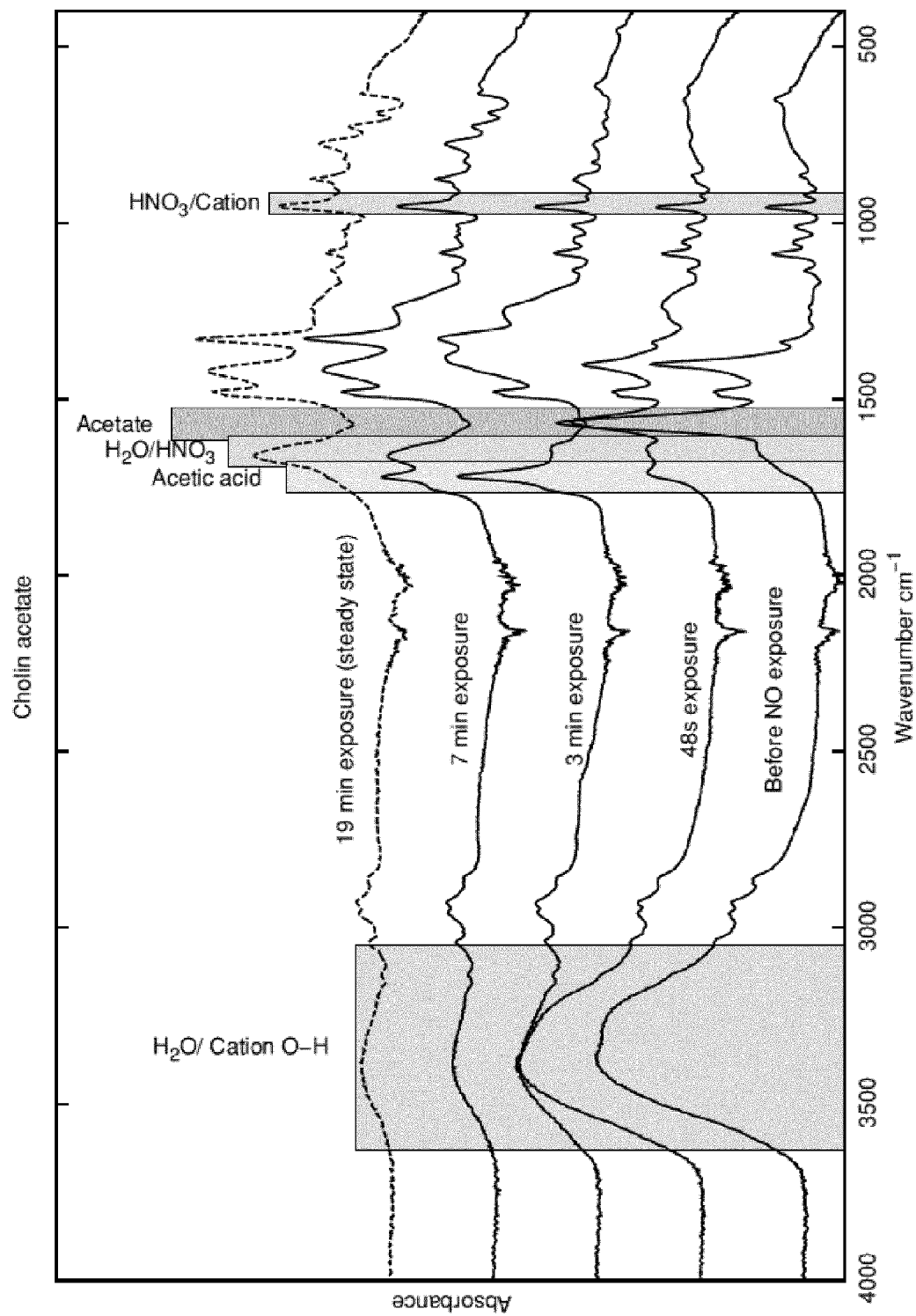

FIG. 15: Selected ATR-FTIR spectra of choline acetate before and after reaction with a flow of 8 ml/min moist air (generated by bubbling through water) mixed with 16 mL/min 10 vol % NO in nitrogen. After reaction until steady state the sample was heated to 120° C. under flow of moist air until steady state was reached.

Figure 16:
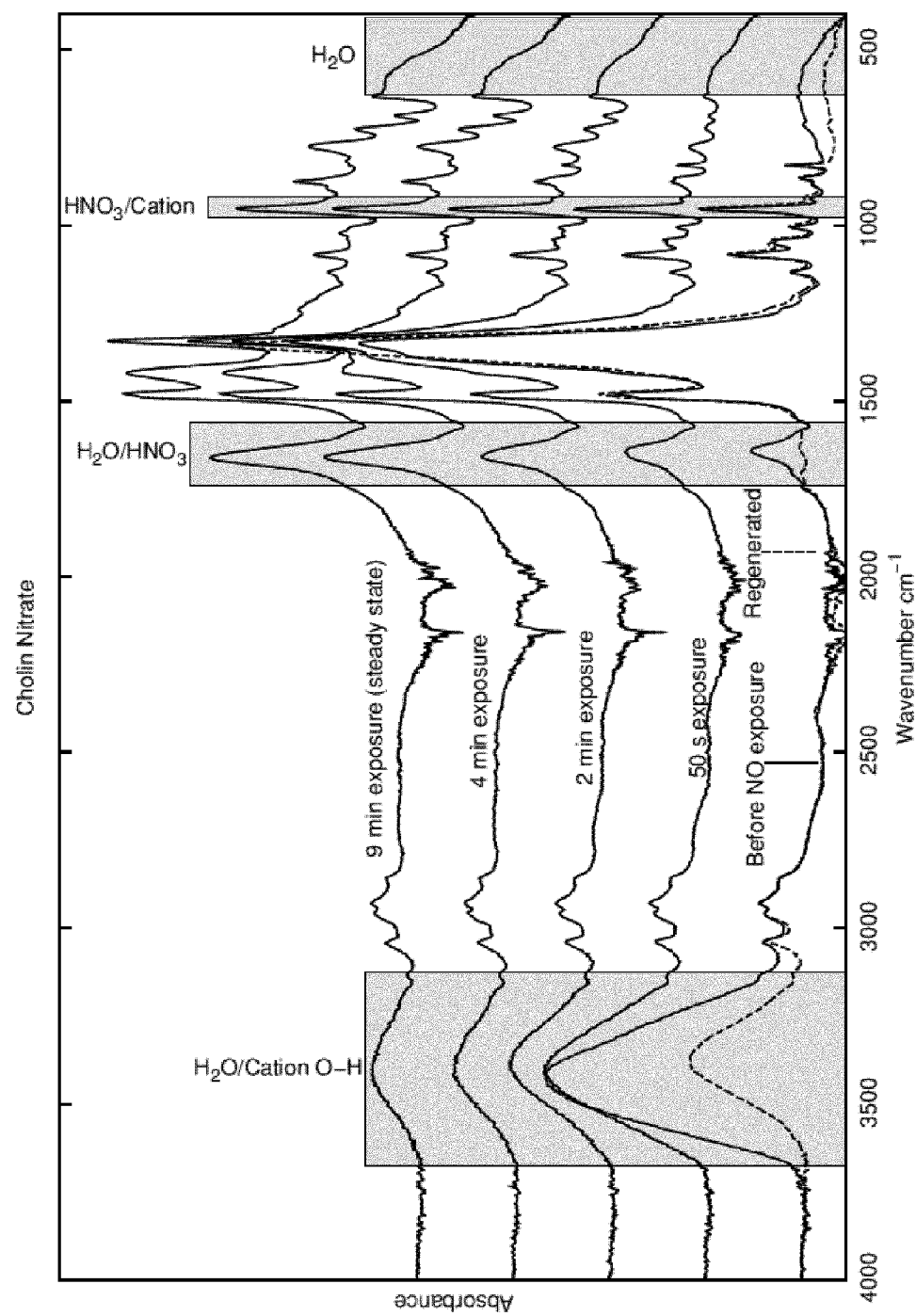

FIG. 16: Selected ATR-FTIR spectra of choline nitrate prepared in situ from choline acetate. The figure shows choline nitrate before and after reaction with a flow of 8 ml/min moist air (generated by bubbling through water) mixed with 16 mL/min 10 vol % NO in nitrogen. After reaction until steady state the sample was heated to 120° C. under a flow of moist air until steady state was reached.

Figure 17:
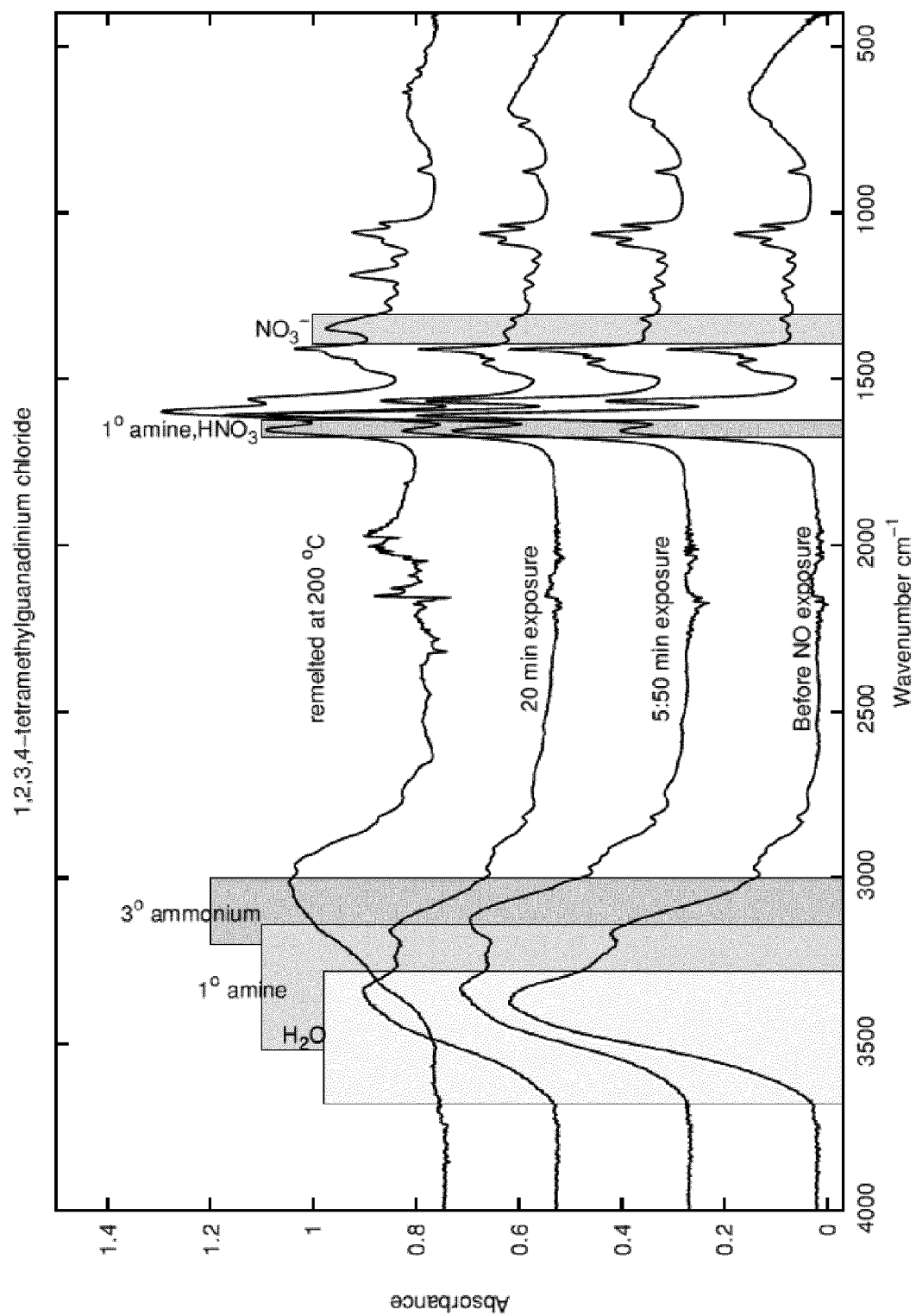

FIG. 17: Selected ATR-FTIR spectra of a melt of [TMGH]Cl and water. Before and after reaction with a flow of 8 ml/min moist air (generated by bubbling through water) mixed with 16 mL/min 10 vol % NO in nitrogen. After reaction until steady state the sample was heated to 200° C. under a flow of moist air until steady state was reached.

Figure 18:
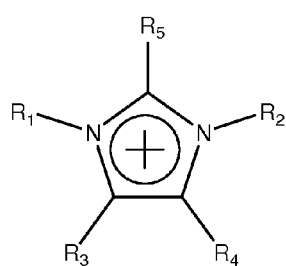
Figure 18:
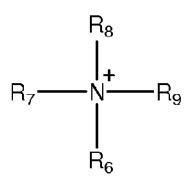
Figure 18:
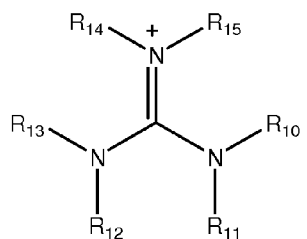
Figure 18:
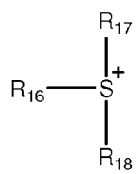
Figure 18:
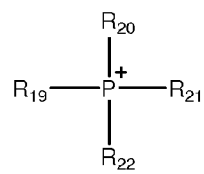

FIG. 18: The cations used in this study as non-limiting examples.

Figure 19:
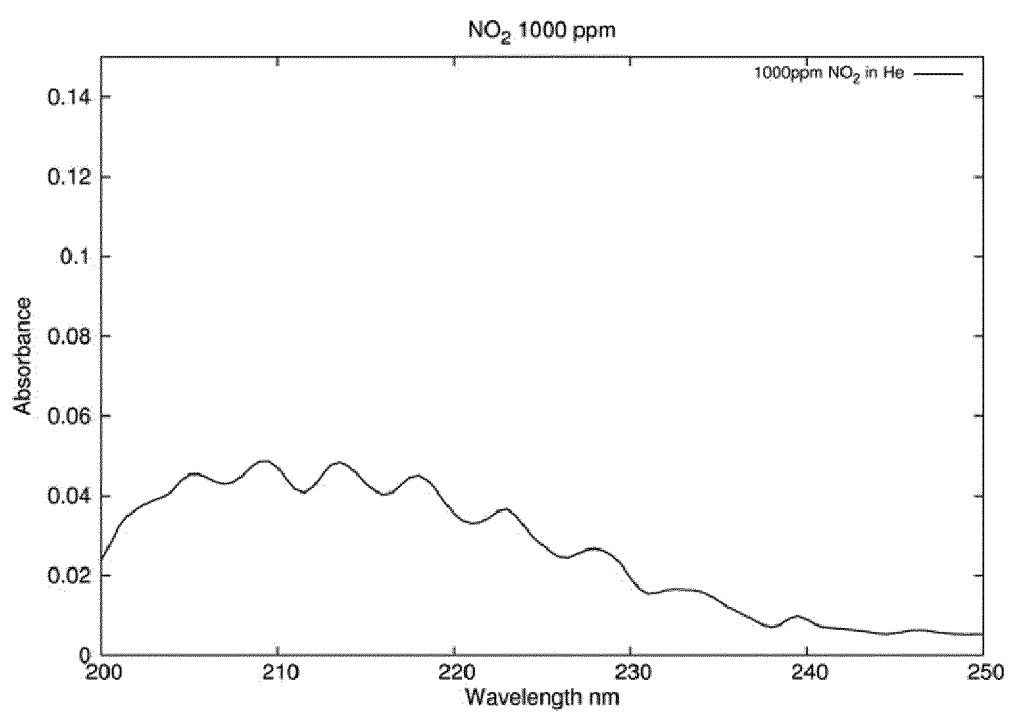

FIG. 19: Spectrum of NO$_2$ in the spectral region used for analysis, the concentration was 1000 ppm with respect to NO$_2$.

Figure 20:
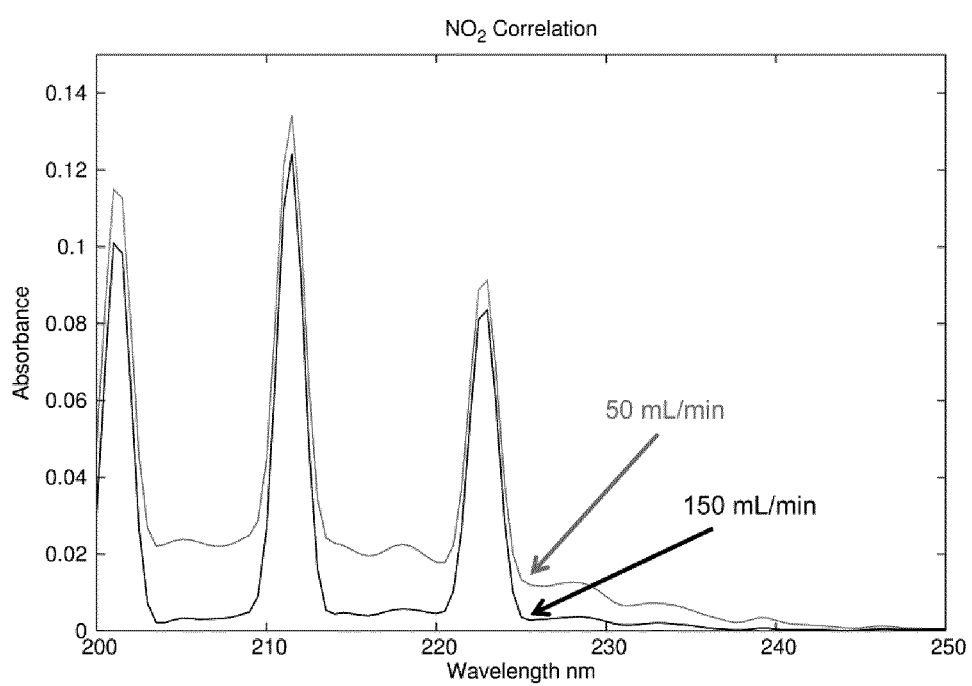

FIG. 20. Spectral data obtained while bypassing the reactor at flow velocities of 50 and 150 ml/min, with a gas composition of 2000 vppm H$_2$O.

Figure 21:
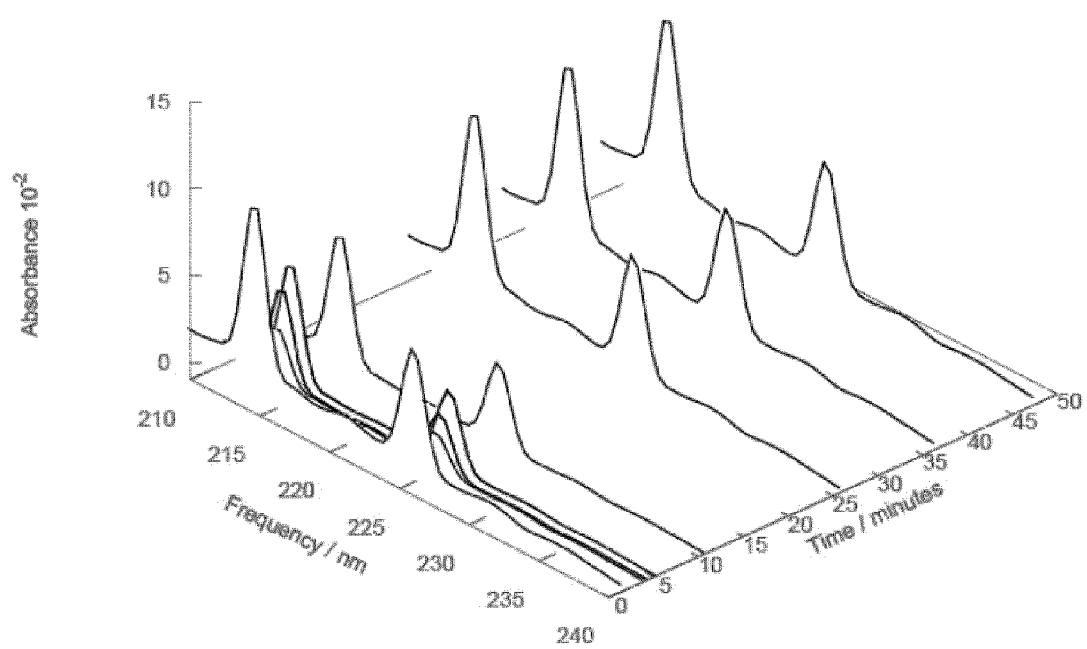

FIG. 21: Selected spectral data, showing the spectral development over time for the uncalcined SILP. The gas composition used was 900 vppm of water and 2000 vppm NO.

Figure 22:
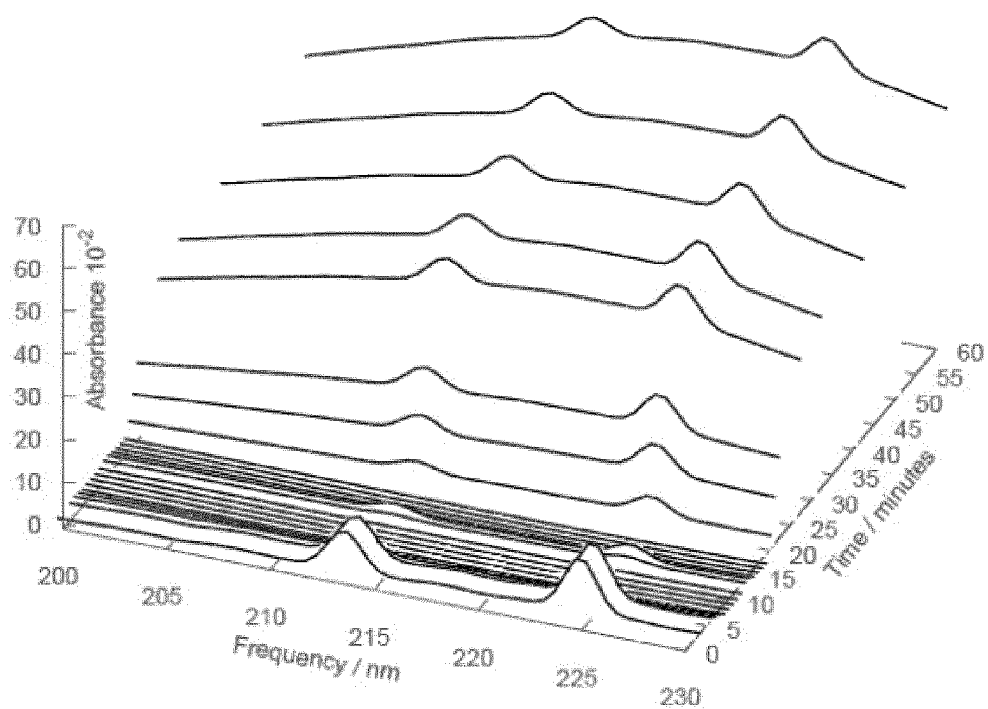

FIG. 22: Selected spectral data, showing the development over time for the dried, uncalcined silica SILP. The concentration of NO$_2$ rises quickly after the immediate absorption, but seems to reach a more steady concentration after 30 min.

Figure 23:
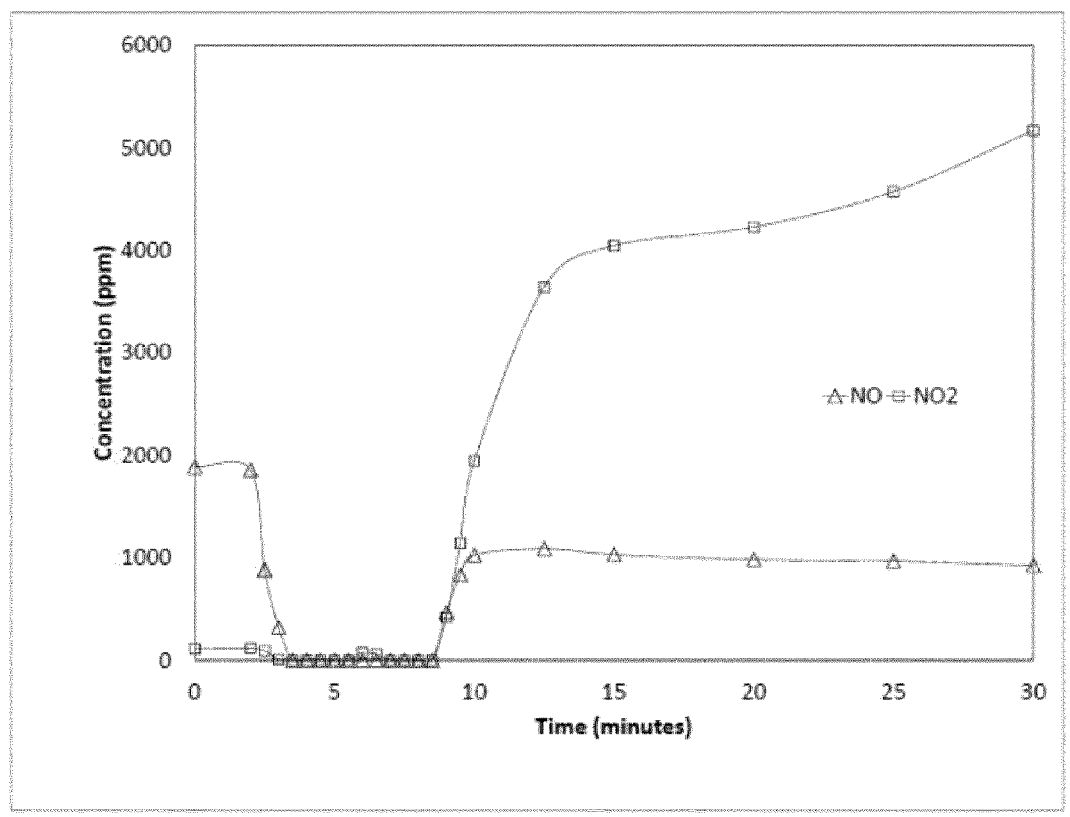

FIG. 23: Development of the concentrations over time for the uncalcined silica SILP, the NO$_2$ concentration has been determined by deconvolution and appears to be much higher than 2000 vppm, this suggests that the NO$_2$ band at this end of the spectrum cannot be used for quantitative determination.

Figure 24:
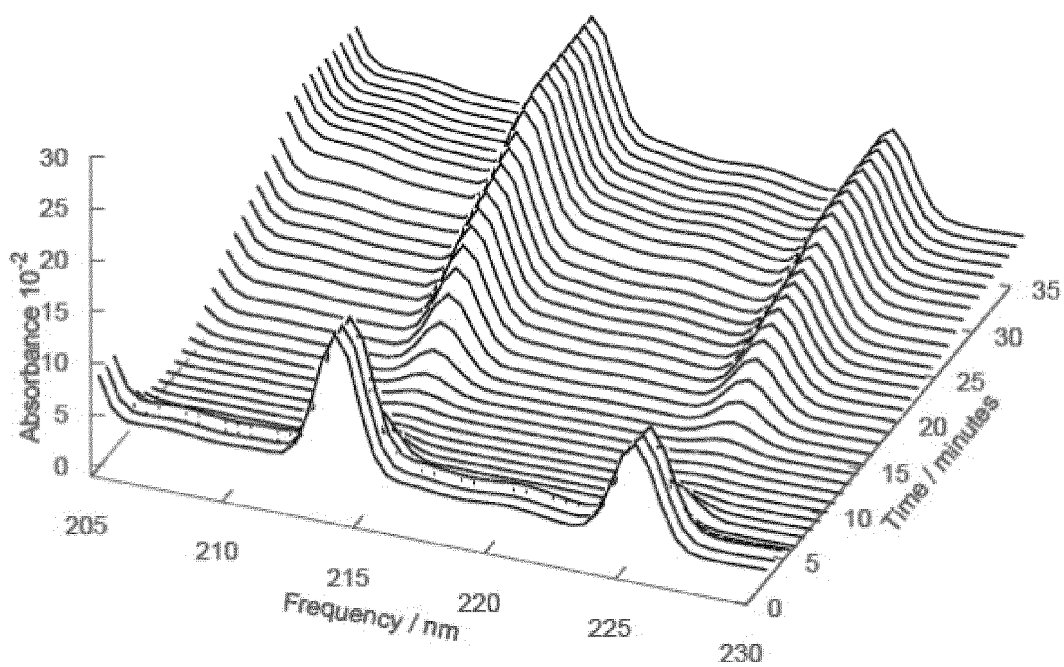

FIG. 24: Selected spectra from the 27th absorption cycle of the calcined silica SILP, at room temperature with a NO concentration of 2000 vppm and a water concentration of 1500 vppm.

Figure 25:
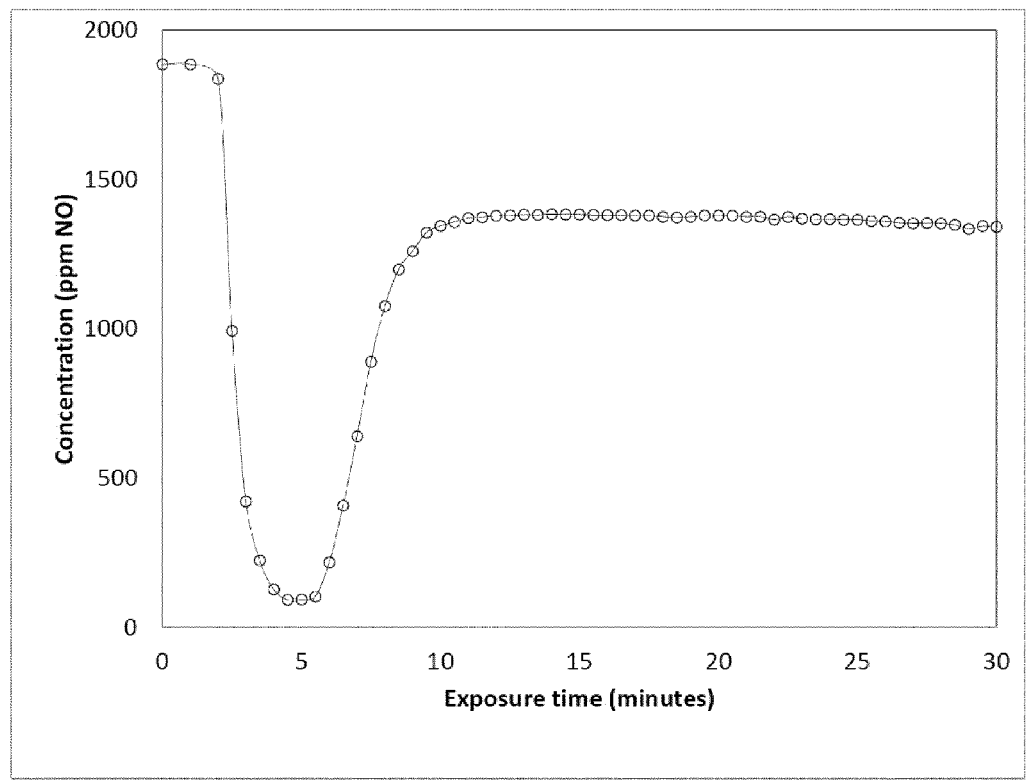

FIG. 25: Development of the NO concentration over time for the same experiment as shown in FIG. 26.

Figure 26:
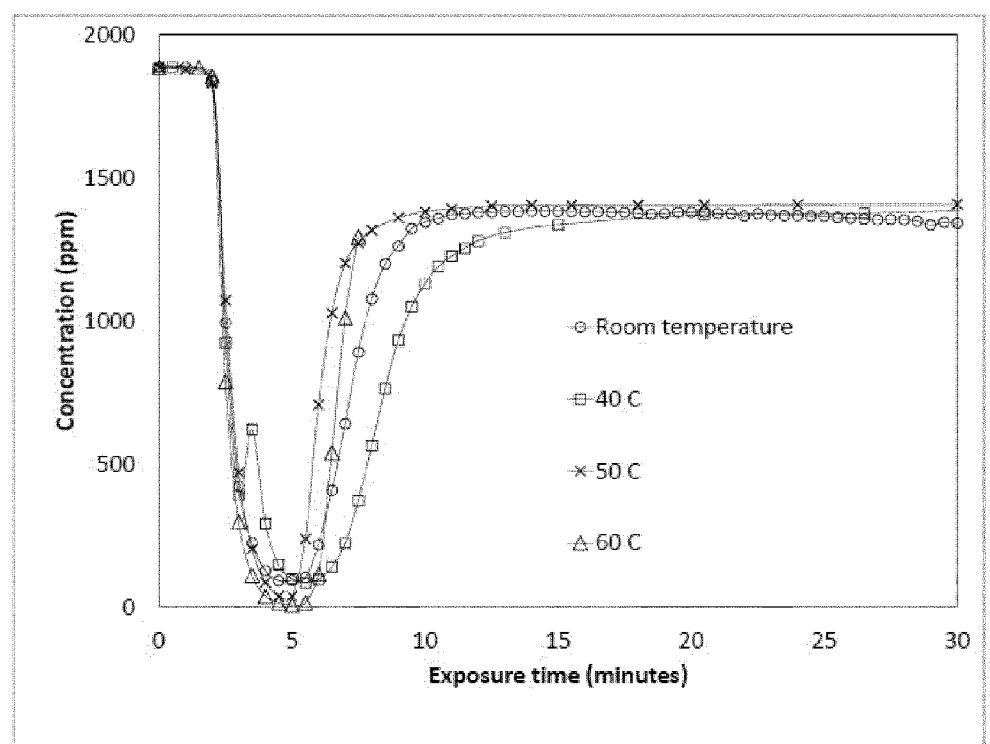

FIG. 26: Development of NO concentration over time for the calcined silica SILP, at temperatures ranging from room temperature to 60° C.

Figure 27:
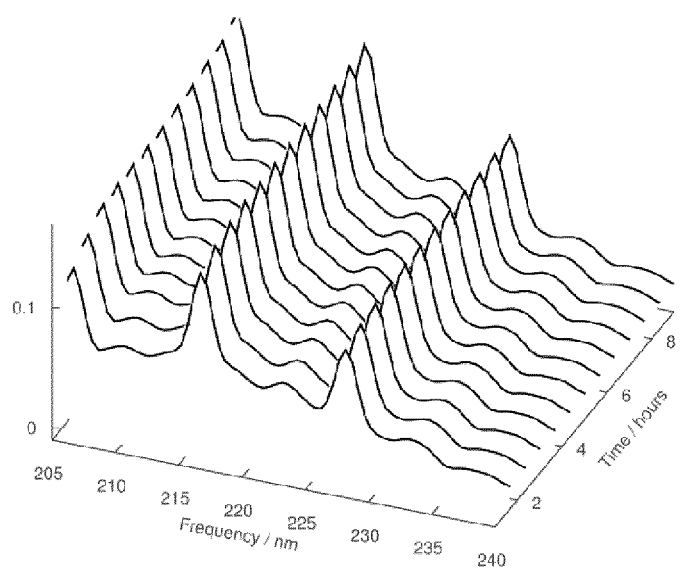
Figure 27:
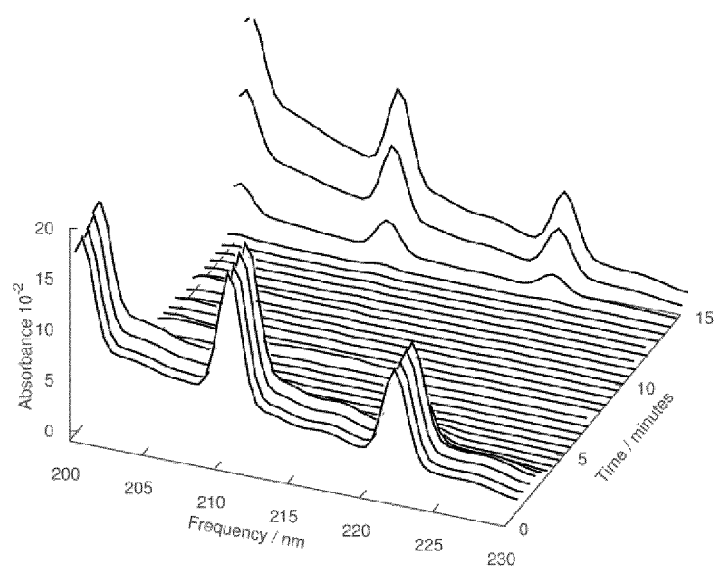

FIG. 27 a and b: Selected spectra from the 24 h experiments of the silica SILP. The spectra in FIG. 27 a were obtained after desorbing in flue gas, and the spectra in FIG. 27 b were obtained after desorbing in a clean gas stream.

Figure 28:
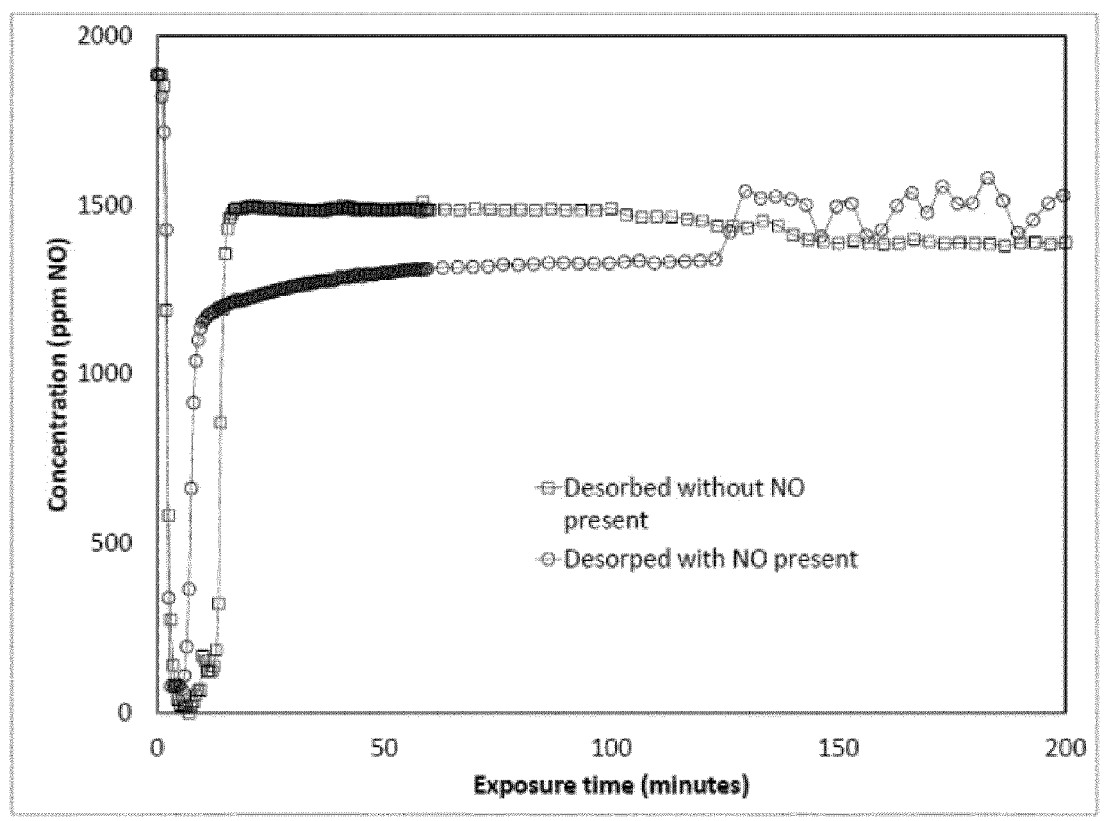

FIG. 28: Development of NO concentration over time, after desorption with and without NO present.

Figure 29:
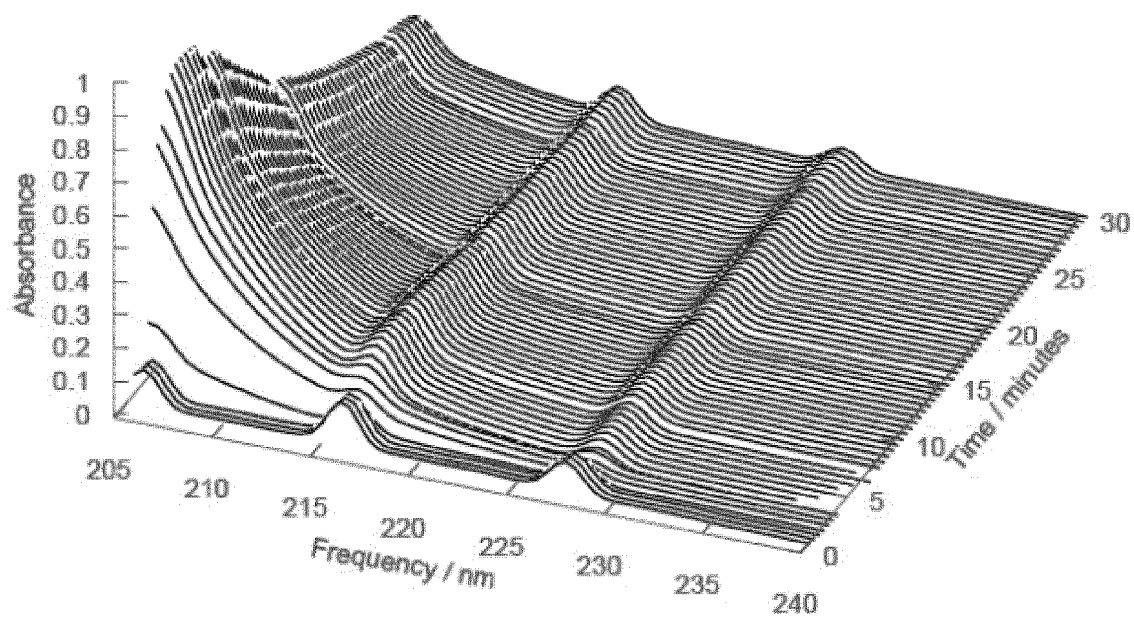

FIG. 29: Selected spectral data obtained for the carbon SILP, at 4000 vppm of water and 2000 vppm NO.

Figure 30:
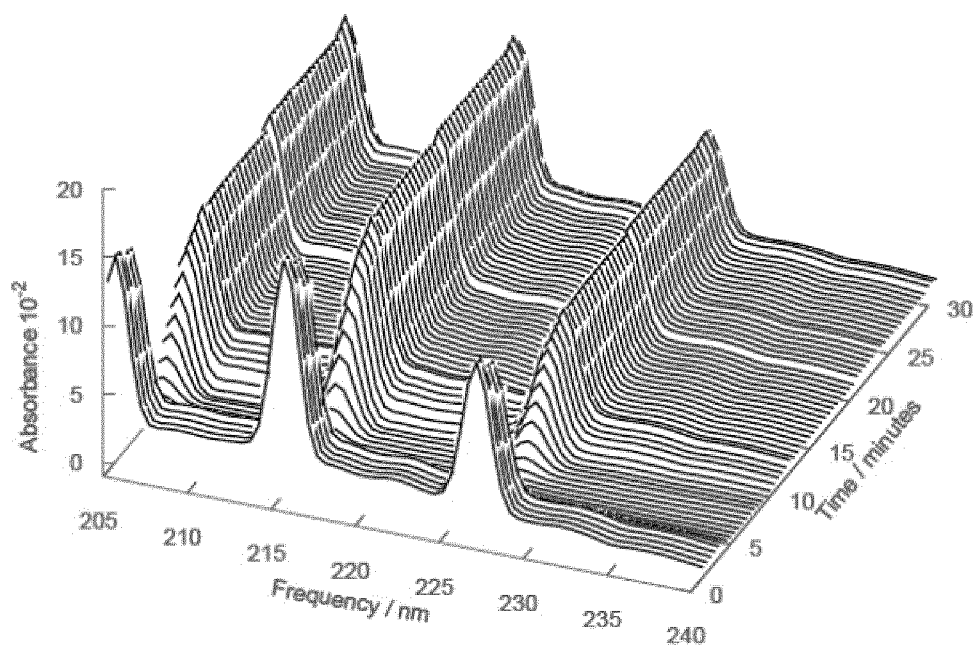

FIG. 30: Selected spectral data obtained for the carbon SILP in a flue gas of 2000 vppm NO, saturated with water at room temperature, giving a water concentration of around 25000 vppm.

Figure 31:
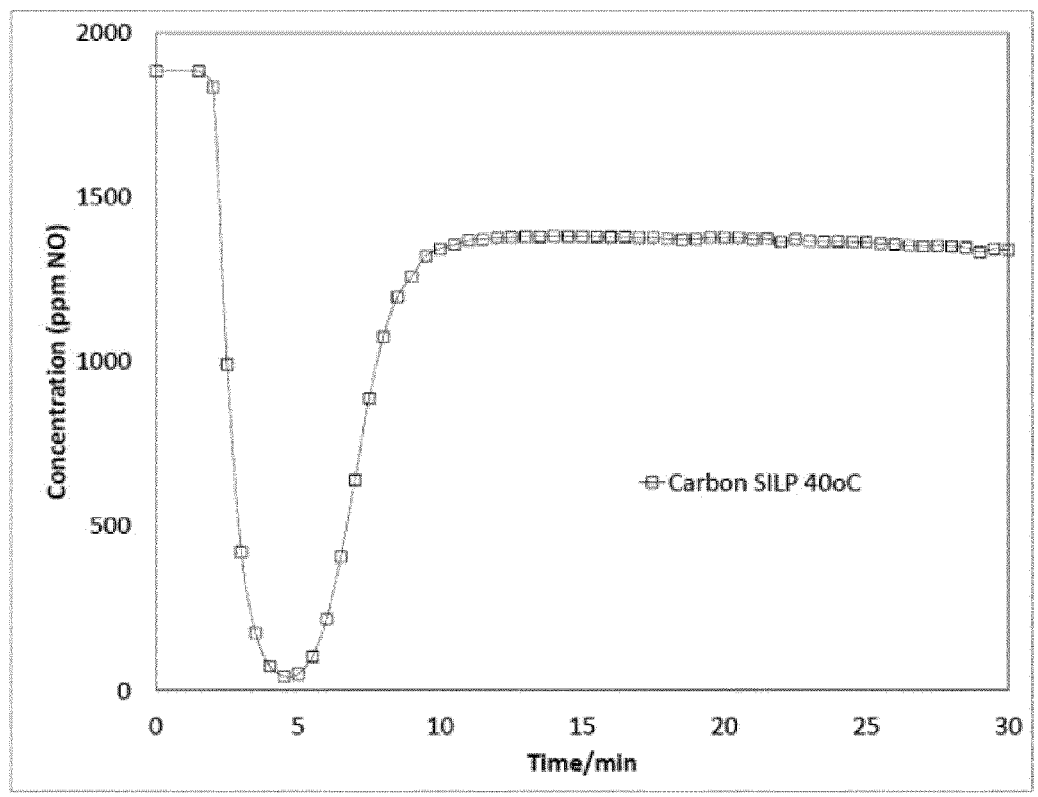

FIG. 31: The development of the NO concentration over time for the carbon SILP, in a flue gas consisting of 2000 vppm of NO which was water saturated.

Figure 32:
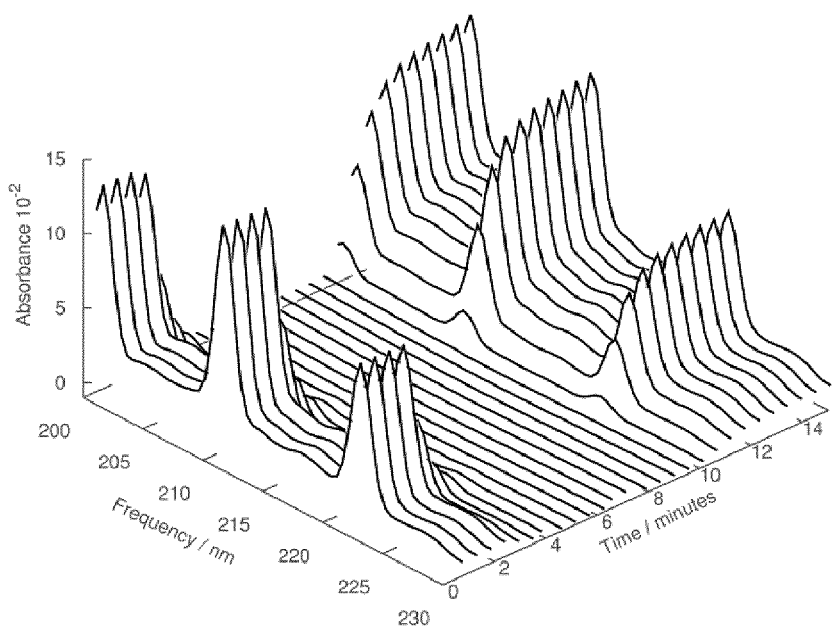

FIG. 32: Selected spectral data for the flue gas passed over an anatase SILP, the gas composition was 2000 vppm NO and 1500 vppm water. There is no observable signal for the missing spectra.

Figure 33:
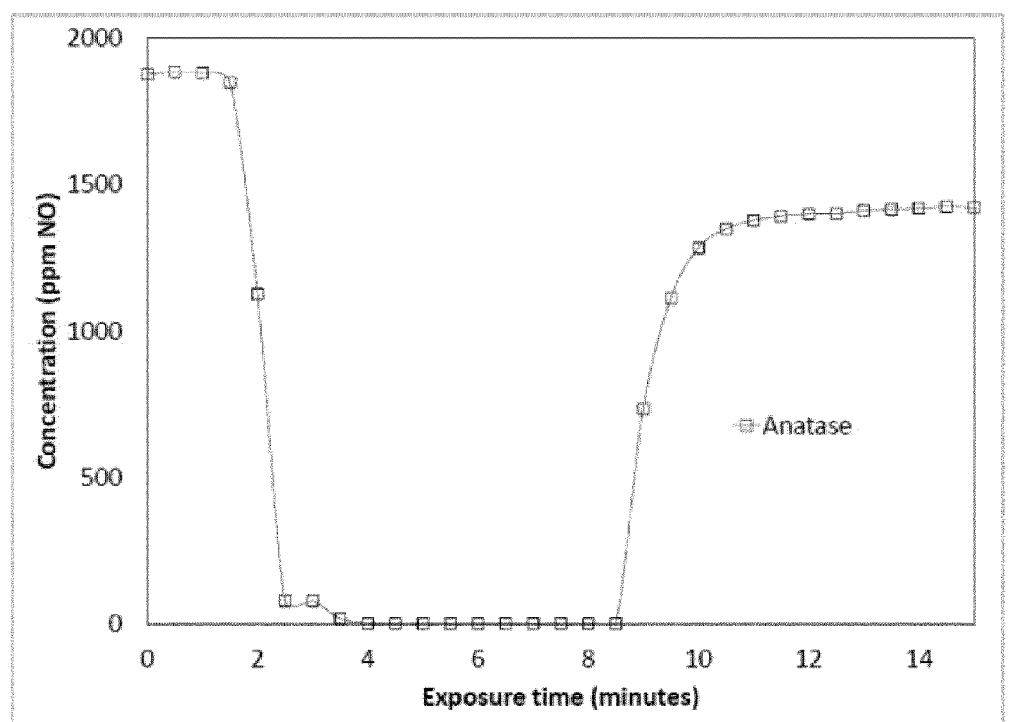

FIG. 33: Development in NO concentration over the first 15 min of the absorption for the anatase SILP.

Figure 34:
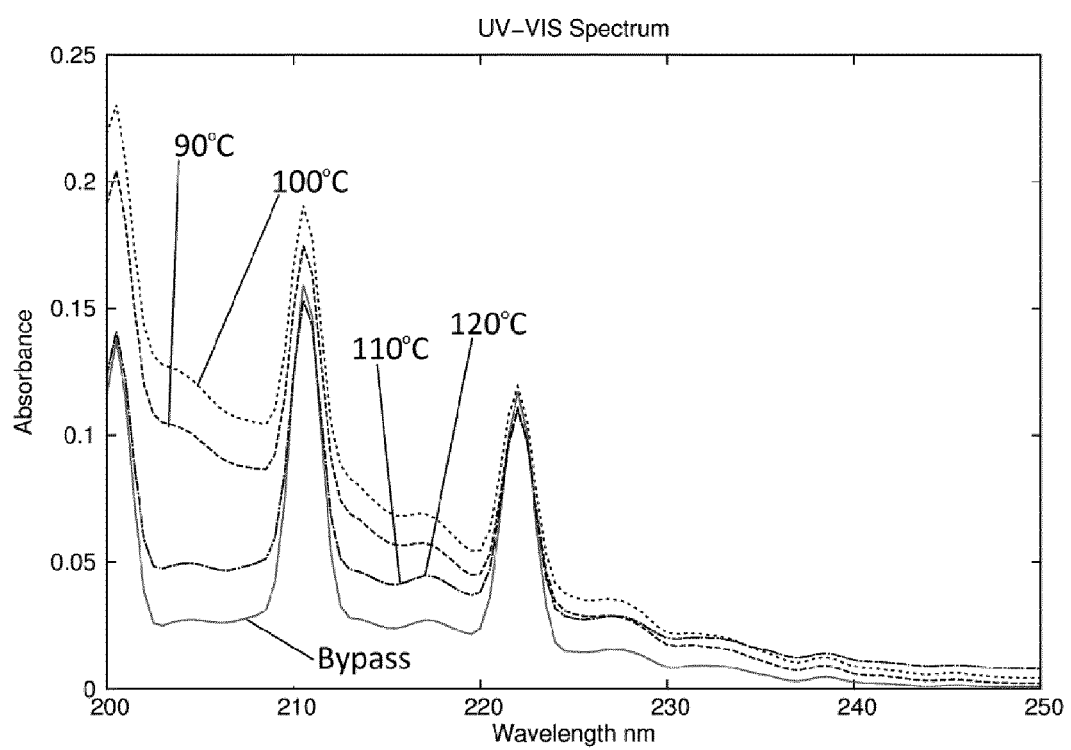

FIG. 34: Spectra obtained after 10 minutes of exposure, at all 4 temperatures for the anatase SILP. The spectra obtained at 110° C. and 120° C. are completely identical.

Figure 35:
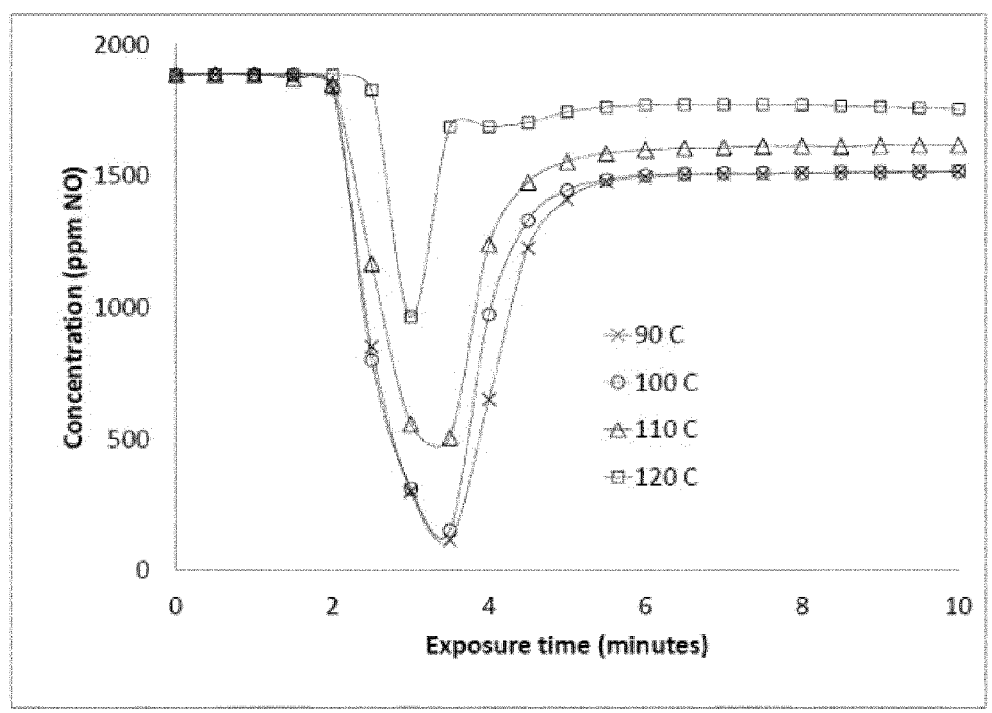

FIG. 35: Development in NO concentration over the first 10 minutes at different temperatures for the anatase SILP.

Figure 36:
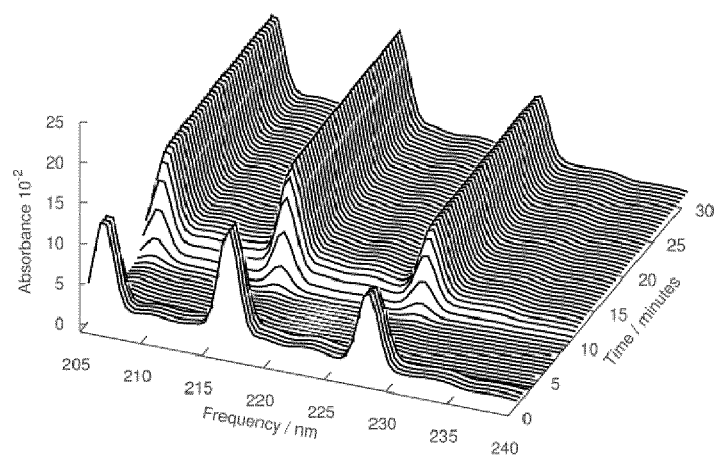
Figure 36:
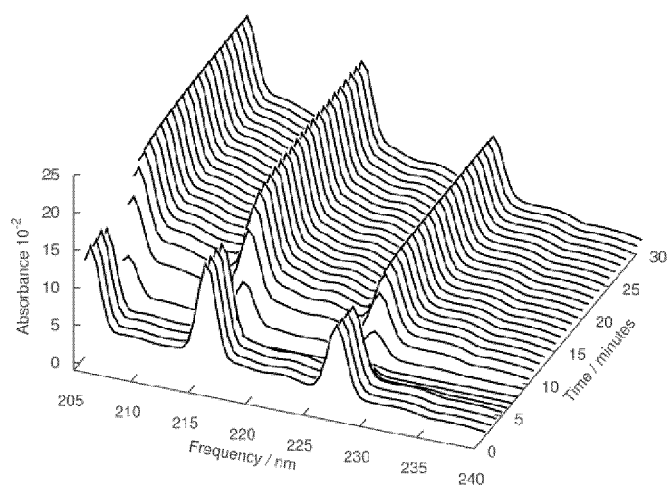

FIG. 36 a and b: Selected spectral data for the anatase SILP obtained during absorption, following desorption in gas without NO (FIG. 36 a) and with NO (FIG. 36 b).

Figure 37:
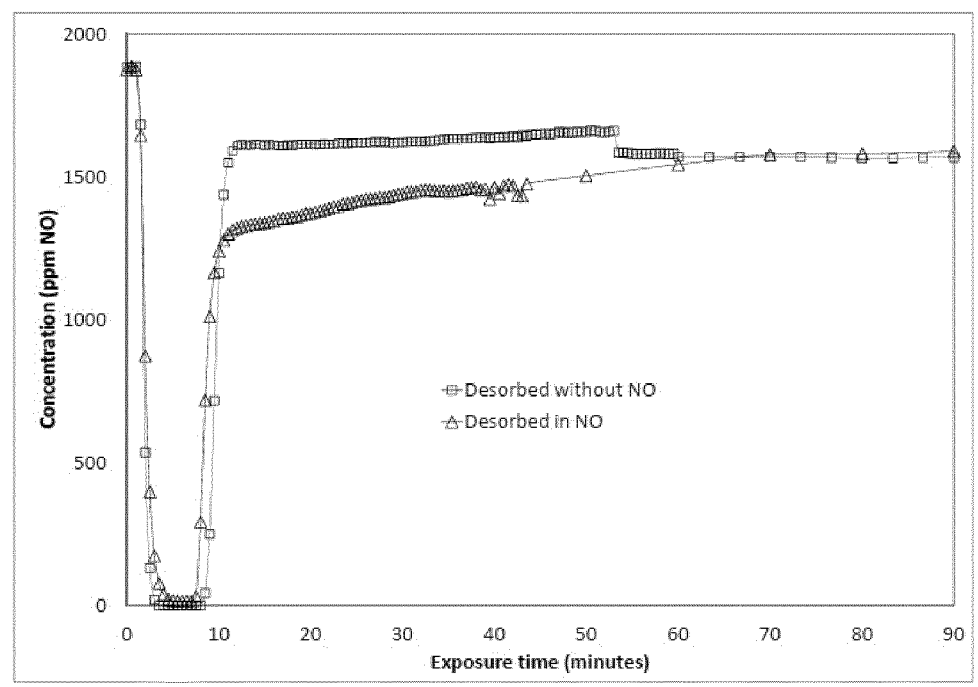

FIG. 37: Development of the NO concentration during the first 90 minutes of the experiment, where after no significant alterations are shown.

Figure 38:
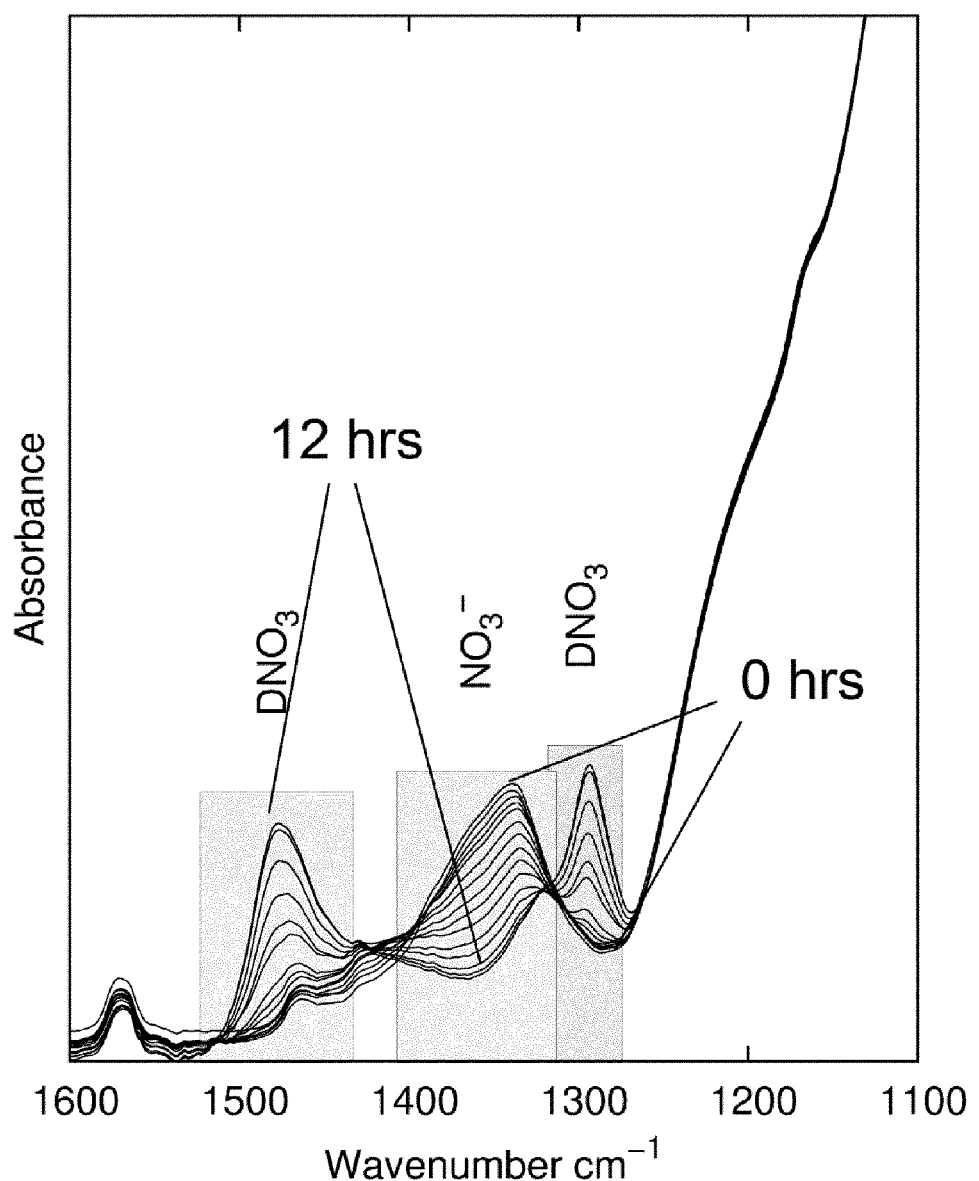

FIG. 38: In-situ ATR-FTIR spectra of the calcined Silica SILP. The spectra were obtained over a 12 hour span.

DETAILED DESCRIPTION OF THE INVENTION

The present invention in a first aspect provides a method for capturing nitric oxide (NO) from gasses containing more than one gaseous compound, which method comprises:
a. absorbing said NO in a liquid ionic composition in the presence of oxygen and water,
b. reacting the absorbed NO with oxygen and water to form nitric acid which accumulates in the liquid ionic composition,
c. optionally removing the formed nitric acid from the liquid ionic composition solution by increasing the temperature and/or decreasing the pressure,
wherein said liquid ionic composition comprises one or more ionic compounds, optionally admixed with a non-ionic solvent.

The absorption of NO and its further conversion to HNO$_3$ in a number of different liquid ionic compositions was investigated comprising one or more of the cations presented in FIG. 18.

The present invention thus in a preferred embodiment provides a method comprising a liquid ionic composition which comprises a cation having the following structure:

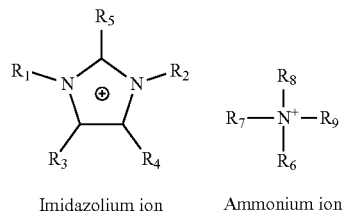

Imidazolium ion          Ammonium ion

-continued

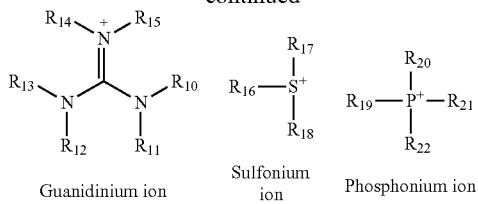

Guanidinium ion    Sulfonium ion    Phosphonium ion

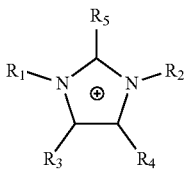

Imidazolium ion wherein

R1, R2, R3, R4, R5, R6, R7, R8, R9, R10, R11, R12, R13, R14, R15, R16, R17, R18, R19, R20, R21 and R22 can be, independently, hydrogen, alkyl, halogenated alkyl, aminoalkyl, hydroxyalkyl, alkoxyalkyl, alkenyl, alkynyl, aryl, heteroaryl, cycloalkyl, cycloalkenyl, heterocycloalkyl, or heterocycloalkenyl;

the positively charged P, N and S atoms may individually be part of heterocyclic or heteroaromatic structures by letting:

two of R20, R21, R22, R23, e.g. R21 and R22 be fused such that a cyclic phosphonium ion is formed, or by letting two of R6, R7, R8, R9 eg. R6 and R7 be fused, such that a cyclic ammonium ion is formed, such as a pyridinium ion, or, by letting two of R11 and R12, R13 and R14, R15 and R10, eg. R11 and R12 be fused, such that a cyclic guanidinium ion is formed, or, by letting two of R16, R17 and R18 eg. R16 and R17 be fused, such that a cyclic sulfonium ion is formed, optionally one or more cations selected from inorganic cations such as Li$^+$, Na$^+$ and K$^+$, and one or more anions selected from $C_1$-$C_6$ alkanoates such as acetate, arylcarboxylates such as benzoate, $C_1$-$C_6$ alkylsulfates such as ethyl sulfate, $C_1$-$C_6$ alkylsulfonates, $C_1$-$C_6$ perfluoroalkylsulfonates such as triflate, $C_1$-$C_6$ perfluoroalkanoates such as trifluoroacetate, $C_1$-$C_6$ perfluoroalkylsulfonimides such as bis(trifluoromethylsulfonyl)imide (triflic imide), tetrafluoroborate, hexafluorophosphate, sulfate, nitrate and halides such as chloride or bromide.

The present invention in a second aspect provides a method for producing nitric acid ($HNO_3$) from nitric oxide (NO), which method comprises absorbing said nitric oxide (NO) in a liquid ionic composition in the presence of oxygen and water, whereby said nitric oxide (NO) is converted into nitric acid ($HNO_3$).

The present invention in a third aspect provides a method for the preparation of anhydrous solutions of nitric acid in a liquid ionic composition, which method comprises absorption of NO and/or $NO_2$ in said liquid ionic composition followed by conversion to $HNO_3$, according to the first or second aspect of the present invention.

As can be seen from Table 2, nitrate and chloride-based ionic liquids have the highest storage capacity for $HNO_3$, whereas the anions having a lower Lewis basicity (triflate and triflic imide) led to much lower storage capacities, but only slightly lower or unchanged reaction rates.

In a preferred embodiment the present invention provides a method for selectively separating NO gas from gasses, e.g. flue gasses comprising absorbing NO by use of a ionic liquid (IL) comprising a N-heterocyclic cation having the following structure:

wherein R1 and R2 are individually selected from C1-C8 alkyl groups or aryl groups, and wherein R3, R4 and R5 are individually selected from hydrogens, C1-C6 alkyl groups or aryl groups or wherein R3 and R4 together with the imidazolium group may form a 4- to 6-membered saturated, unsaturated or aromatic ring, which may further contain up to three hetero atoms selected from oxygen, nitrogen and phosphorus.

In a further specific embodiment the cation is selected from 1-ethyl-3-methylimidazolium ([EMIM]$^+$), 1-butyl-3-methylimidazolium ([BMIM]$^+$) or 1-butyl-2,3-dimethyl-imidazolium ([BDMIM]$^+$).

In a specific embodiment of the invention a method is provided according to the first aspect of the invention, wherein said IL further comprises one or more anions selected from $C_1$-$C_6$ alkanoates such as acetate, arylcarboxylates such as benzoate, $C_1$-$C_6$ alkylsulfates such as ethyl sulfate, $C_1$-$C_6$ alkylsulfonates, $C_1$-$C_6$ perfluoroalkylsulfonates such as triflate, $C_1$-$C_6$ perfluoroalkanoates such as trifluoroacetate, $C_1$-$C_6$ perfluoroalkylsulfonimides such as bis(trifluoromethylsulfonyl) imide (triflic imide), tetrafluoroborate, hexafluorophosphate, sulfate, nitrate and halides such as chloride or bromide.

In a specific embodiment the IL is selected from 1-ethyl-3-methylimidazolium ([EMIM]$^+$) acetate, 1-butyl-3-methylimidazolium ([BMIM]$^+$) acetate, 1-butyl-3-methylimidazolium ([BMIM]$^+$) nitrate, 1-ethyl-3-methylimidazolium ([EMIM]$^+$) triflate, 1-butyl-3-methylimidazolium ([BMIM]$^+$) triflate, 1-butyl-2,3-dimethylimidazolium ([BDMIM]$^+$) nitrate, choline chloride, choline nitrate or mixtures thereof.

In a particular embodiment the liquid ionic composition comprises an anion which is basic.

In a particular embodiment the comprised anion is nitrate ($NO_3^-$).

In a particular embodiment the comprised anion is chloride (Cl$^-$).

In a particular embodiment the comprised anion is acetate (OAc$^-$).

In a further embodiment the comprised anion is triflate (OTf$^-$).

In a further embodiment the comprised anion is triflic imide ($Tf_2N^-$).

In a particular embodiment the liquid ionic composition comprises [BMIM]OTf.

In a particular embodiment the liquid ionic composition comprises [BMIM]OAc.

In a further specific embodiment $R_1$ and $R_2$ are individually selected from $C_1$-$C_{16}$ alkyl groups or aryl groups.

In another specific embodiment $R_1$ and $R_2$ are individually selected from $C_1$-$C_{12}$ alkyl groups or aryl groups.

In a yet another specific embodiment $R_1$ and $R_2$ are individually selected from $C_1$-$C_6$ alkyl groups or aryl groups.

In an embodiment of the invention a method is provided for desorption of the absorbed $HNO_3$ from the liquid ionic composition by reducing the pressure.

In a further aspect the invention also concerns the use of an IL where said captured $HNO_3$ is desorbed from the liquid ionic composition by increasing the temperature.

Preliminary examination of the absorption of $N_2$ in [BMIM]OAc was also undertaken. This did not result in any measurable weight increase, from which it can be concluded that only NO is absorbed when passing $NO/N_2$ through the [BMIM]OAc.

The present invention in a fourth aspect provides the use of an ionic composition as defined in the present application for capturing nitric oxide (NO) from gasses containing more than one gaseous compound.

Supported Ionic Liquid Phase (SILP) Materials

Supported Ionic Liquid Phase (SILP) materials consist of an ionic liquid distributed over a porous support material with a high surface area. SILP materials are particularly practical for reactions involving gas phase reactants and may be used as catalysts, where the ionic liquid is the catalytically component itself or is used to dissolve catalytically components in the ionic liquid phase, or as gas absorbers. Since most ILs are highly viscous, simply bubbling a gaseous reactant through the liquid leads to an insufficient substance transport over the phase boundary due to the large bubble size. The SILP formulation eases diffusion, since the available surface area becomes much larger. A schematic illustration of the SILP concept is found in FIG. 1.

The absorption of NO and its conversion to $HNO_3$ was investigated in a number of Supported Ionic Liquid Phase (SILP) absorber compositions. As examples of porous carrier materials three different support materials were investigated: Silica (Saint-Gobain, SS611138), Anatase (Saint-Gobain, ST 31119) and Carbon (Cabot, Black Pearl 1400). The porous support material was crushed and fractioned to obtain particles of sizes from 180-355 μm.

In the case of the silica two SILP absorbers were prepared; one using the fractionated silica "as is" and one using calcined silica. The fractioned silica was calcined at 500° C. for 20 hours, and cooled to room temperature in a desiccator. The pore volume and specific area of the support material was determined by BET (see Table 1).

TABLE 1

BET measurements for the different supporting materials used.

| Support | Surfare area (m²/g) | Port volume (m³/g) |
|---|---|---|
| Silica | 251 | 0.93 |
| Anatase | 150 | 0.38 |
| Carbon | 580 | 0.71 |

To prepare the SILP absorbers a volatile solvent was added in excess to the pure support material; methanol for anatase and dichloromethane for both silicas and for the carbon. An amount of IL corresponding to a pore volume filling of 25-30% was weighed and added to the mixture under stirring. The volatile solvent was then evaporated slowly under reduced pressure to obtain a good distribution of IL on the surface of the support material.

Support Materials and their Role

A comparison of the supports based on the obtained results, can be found in FIG. 2. Here the uncalcined silica SILP is excluded, also it has to be taken into account that the amount of IL in the calcined silica SILP is 50% larger than for the carbon and anatase SILPs.

Based on these results it is evident that the anatase and calcined silica SILPs are far superior to carbon SILP which may be attributed to the hydrophobic properties of carbon. The uncharged surface of the carbon may further hinder the full dispersion of the IL. This suggests that the support material should have either acidic or basic properties in order to induce proper dispersion of the IL on the surface of the SILP material.

The present invention thus in a fifth aspect provides the use of an ionic composition as defined in the present application absorbed on a porous carrier and used in the form of a supported ionic liquid phase (SILP) material for capturing nitric oxide (NO) from gasses containing more than one gaseous compound.

In a preferred embodiment the carrier is a mesoporous material which may be selected from highly porous carrier materials such as $SiO_2$, $Al_2O_3$, $TiO_2$, $CeO_2$, $ZrO_2$, carbon or a combination of two or more of these.

In a specific embodiment of the invention the porous carrier according to the fifth aspect of the invention is anatase $TiO_2$.

In another specific embodiment of the invention the porous carrier according to the fifth aspect of the invention is calcined $SiO_2$.

In yet another embodiment of the invention a method is provided according to the first aspect of the invention, wherein the IL is absorbed on anatase $TiO_2$ and used in the form of a supported ionic liquid phase (SILP) material.

In another specific embodiment of the invention a method is provided according to the first aspect of the invention, wherein the IL is absorbed on calcined $SiO_2$ and used in the form of a supported ionic liquid phase (SILP) material.

In a another embodiment of the invention a method is provided according to the first aspect of the invention, wherein the IL is absorbed on a porous carrier and used in the form of a supported ionic liquid phase (SILP) material, which after absorption of NOx may regenerated by heating and re-used with no apparent loss of activity.

In specific embodiments the gasses according to the first, fourth or fifth aspect is a flue gas originating from large stationary sources like power or incineration plants or cement production plants.

In other specific embodiments the gasses according to the first, fourth or fifth aspect is a flue gas originating from mobile emission sources like e.g. commercial marine vessels or mobile incineration plants for incineration of eg. domestic or industrial waste, which typically require a small installation footprint, low energy consumption and preferably no carrying of hazardous chemicals.

Throughout the present application, if not otherwise specified, 'incineration plant' shall mean any stationary or mobile technical unit and equipment dedicated to the thermal treatment of wastes with or without recovery of the combustion heat generated. This includes the incineration by oxidation of waste as well as other thermal treatment processes such as pyrolysis, gasification or plasma processes in so far as the substances resulting from the treatment are subsequently incinerated.

The conversion capacities of NO to $HNO_3$ in the liquid ionic compositions reported here reveal a promising system for NO scrubbing of dust-free tail-end gases, not requiring the addition of reductant such as ammonia or urea. Since no additive is needed to reduce the NO in the gas stream, the complexity of the NO removal system is somewhat reduced compared to the $NH_3$-SCR process. Assuming that the selectivity toward NO sorption and oxidation is sufficiently high, it opens new possibilities of NO removal. The captured NO could easily be removed as $HNO_3$ by increasing the temperature (temperature swing), as observed previously. Transport of the $HNO_3$-saturated IL (i.e. by exploiting the differences in viscosity) or the SILP particles to another container or location followed by desorption of $HNO_3$ would enable the NO gas to be used in a 'from waste to value' concept.

The conditions at the Electrabel's Langerlo Power Station in Belgium [J. J. van Ormelingen et al., *Combined Power Plant Air Pollutant Control MEGA Symposium, Washington, DC, USA* (2003)] can be used as an example for considering the implementation of an IL scrubber based on the reversible liquid ionic compositions system. Here, the removal of 1000 vppm NO under a total flow of 820,000 Nm$^3$/h would only require an effective IL volume of less than 10 m$^3$/h to remove all the incident NO. Even though the mass-transfer issue is not considered here (which is expected to be minimized by using the SILP technology), the IL-volume is considerably lower than the SCR catalyst volume of 268 m$^3$.

NO removal in mobile units, such as commercial marine vessels and mobile incineration units for eg. domestic or industrial waste represent other relevant examples for considering the implementation of an IL scrubber based on the reversible liquid ionic compositions system of the present invention because of the much less hazardous reaction conditions, lower reaction temperatures and smaller projected installation footprint.

One of the major drawbacks of the conventional catalysts for deNOx is deactivation, which over time reduces the amount of NOx the catalyst can remove. For instance the vanadia-titania based catalyst (TWC) used for SCR is poisoned by potassium, which causes a dramatically drop in activity. This is especially a severe problem when biomass such as straw is used as fuel. The high chlorine and potassium content of the straw causes the activity to drop to less than 20% of the initial activity within the first 2000 operating hours. This is a drawback as it prevents direct use of fast growing biological material in the power plants, due to the high content of chlorine and potassium from salts and fertilizer. Also these biological fuels contain higher amounts nitrogen, which gives rise to an increased amount of fuel and prompt NOx. The SCR catalysts are only slightly deactivated when light fossil fuels are used. The deactivation is, however, significant for heavy fuel oil of the type used in maritime transport, which indicate that there is room for improvement in this segment.

Deactivation of the TWC is also an issue; many factors influence the deactivation of these catalysts such as heavy metal poisoning, mechanical degradation (crushing and attrition) and thermal degradation. Many efforts are being made in order to prolong the lifetime of the commercial TWC, among which preventive coating and trapping of the poisoning agents can be mentioned.

Very often, fuels containing alkali metals as well as earth alkali will also contain significant amounts of alkali metals as well as earth alkali in the resulting flue gases upon incineration or burning. Fossil fuels, such as oil, natural gas and coal contain lower amounts of alkali metals and earth alkali metals. Waste, such as waste burned in waste incineration plants contains high levels of alkali metals as well as earth alkali metals. Biomass or biomass fuel such as straw, woodchips and wood pellets contain very high levels of alkali metals, especially K, as well as earth alkali metals. In the case of fly ash from burning straw, alkali metals and earth alkali metals can comprise as much as half of the total weight of the fly ash. Flue gases stemming from the incineration of biomass fuel typically contain about 200-1000 mg KCl/Nm$^3$, whereas incineration of coal only leads to ppm levels of KCl.

Experimental
General Setup
UV-Vis Spectroscopy

UltraViolet-Visible spectroscopy was used to interpret the data collected. The background sample was obtained in a flow of air. The concentration of NO and NO$_2$ are of interest when interpreting the collected data. Both species have significant absorption bands in the Ultra-Violet part the spectrum. NO has 3 sharp absorption bands between 250 and 200 nm; the first at around 227 nm. This band is quantifiable, and has been the main way to quantify NO concentration in the outlet gas. Also NO$_2$ has a very broad band peaking around 214 nm, NO$_2$ also has another broad band around 400 nm.

The data obtained from the UV-Vis spectrometer has been used to determine the concentrations of NO and NO$_2$ by deconvoluting each of the spectra with several Gaussian functions (one for each peak, also the NO$_2$ peak), and then integrating these functions in order to determine the area of the peaks. The deconvolution has been done using Gnuplot4 and an example of a deconvoluted spectrum is shown in FIG. 4.

In-situ ATR-FTIR Spectroscopy

Figure 5:
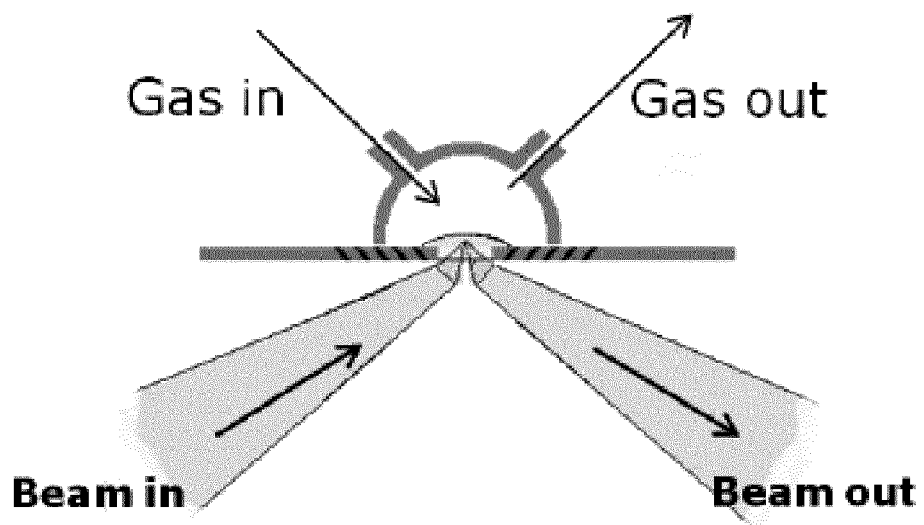

The experimental setup used for the in-situ ATR-FTIR is shown in the FIG. 5. The FT-IR Measurements was performed on a heatable diamond ATR plate (Pike GladiATR) using a Nicolet iS5 spectrometer. In order to control the atmosphere over the ionic liquid film on the ATR crystal, a stainless steel cap with a heat resistance polymer sealing was constructed. The steel cap was supplied with two fittings of in- and outlet gas. The inside volume of the cap was approximately 2 milliliter (mL). The ATR cell could be heated up to 300° C. In the first three examples 8 scans with a resolution of 4 cm$^{-1}$ was used to record each spectrum. The duration of each recording was 11 seconds under these conditions. In the later examples, the number of scans was decreased to 4 lowering the recording time to 6 seconds. The spectra were ATR corrected using OMNIC Lite software, assuming a refractive index of 1.5.

The iS5 spectrometer as well as the base optics in the Pike ATR cell was purged with nitrogen in order to minimize loss of the signal to gas phase water and carbon dioxide inside the instrument.

Gases used: Argon 99.999%, Nitrogen 99.99999%, 10 vol % nitrogen oxide in nitrogen, and pressurized air. Gases used for the experiments were purchased from AGA. The gas flow was controlled with Bronkhorst mass flow controllers. In experiments with water in the gas, air or argon was bubbled through a glass frit in a flask with distilled water. The resulting water content in the gasses after saturation was calculated to 2.7 vol % from the vapor pressure at room temperature.

Deconvolutions of the ATR-IR spectra were performed with Systat Peakfit 4.12 software using the build in "Residuals" Algorithm. The typical procedure was to fit the steady state spectra with Gaussian curves allowing both width and position of each peak to move. When a good deconvolution was made on the steady state spectra the peak parameters obtained from this deconvolution was saved and used for the next spectra. Now both position and width of each peak was constrained, so only the intensity of the peaks was changed during the following deconvolutions. The concentration of HNO$_3$ was determined either from integration of the band around 1650 or 940 cm$^{-1}$ after deconvolution. In the case of water in [BMIM]Cl the broad band at 3400 cm$^{-1}$ was used. To make an absolute estimate of the HNO$_3$ concentration a standard solution was prepared with concentrated nitric acid (68 vol %) in [BMIM]NO$_3$. The spectra of the standard solution were fitted using the same peak parameters as for the steady state spectra.

When analyzing the SILP materials, a slightly modified version of the cap shown in FIG. 5 was used. The modified version contained a built-in pressure plate to create an even surface. An illustration of the device is shown in FIG. 6. This setup makes it possible to conduct in-situ measurements of the surface of the SILP while absorption of NO is occurring, which in turn makes it possible to determine the changes in the chemical composition on the surface. All ATR-FTIR spectra were ATR corrected using OMNIC8, assuming a refractive index of 1.5.

An experimental procedure to measure the NO absorption capacity by weight increase in the ILs can also be employed, wherein preliminary gas absorption is carried out in a ca. 5 ml test tube with 1 ml ionic liquid (IL) at room temperature (22-23° C.). The 10 vol % NO/N$_2$ gas mixture is introduced into the IL through a glass Pasteur pipette retrofitted with a glass frit to reduce the bubble size and increase the gas-liquid contact area (interfacial area). The flow is maintained at around 5 ml/min to contain the bubbles formed within the test tube.

The absorption of NO is monitored in real time by logging the weight increase with a PC interfaced with the microbalance (accuracy 0.1 mg). However, to avoid balance drifting, the absorption results are supplied by measuring the total weight of the test tube with IL and pipette before and after NO absorption. Any increase in weight of the sample after NO exposure is attributed to the absorption of NO and subsequent conversion to HNO$_3$ and variations in the water content of the sample.

The weight increase is in all cases given as the fractional molar increase, defined in equation A.1.

$$X_{NO}^{IL} = \frac{n_{NO}}{n_{NO} + n_{IL}} \quad (A.1)$$

A Metrohm Titrando 835 Karl Fisher titration instrument was used to determine the water content on four samples with water in 1-butyl-3-methyl-imidazolium chloride (Aldrich 99%) used for the standard curve for water. The concentration was determined as the mean value of 3 titrations.

SILP Testing

For testing of the prepared SILP absorbers, a reactor was loosely packed. The reactor consisted of a stainless steel tube, with a grid and an inside diameter of 8 mm. The reactor was placed in an oven and insulated in order to control the temperature. The reactor was packed by positioning quartz wool on top of the grid, followed by the SILP material, which was loosely packed. A simulated flue gas was passed through the reactor; the composition of the flue gas could be varied using a Bronkhorst mass flow controller.

The flue gas was composed of three individual streams: dry atmospheric air (passed through a drying filter), dry atmospheric air bubbled into water through a frit in order to water saturate the stream, and 1 vol % NO in Helium provided by AGA. All tubing was done using Swagelock components.

The outlet of the reactor was connected to a UV-VIS spectrometer equipped with a gas cuvette of length 10 cm. To avoid condensation, the cuvette was heated throughout the experiments to 100 degrees. A thermometer was mounted just above the SILP absorber to measure accurate temperatures in the reactor during the experiments. A schematic illustration of the used setup is shown in FIG. 3.

The main focus in testing the SILP has been to demonstrate that there is significant absorption of NO and to determine the effect of temperature changes, and changes in flue gas composition. The total flow speed through the reactor has been set at 50 ml/min; this has been kept constant through all experiments. The concentration of NO has been kept constant at 2000 vppm through most of the experiments.

Regeneration/Desorption of the SILP Absorber

The nitric acid formed during the absorption can be desorbed, regenerating the SILP absorber. Various methods for desorption have been tested at various temperatures and various gas compositions. The typical method used for desorption has been raising the temperature in the reactor to 120° C. and increasing the flow rate to 150 ml/min using a mix of wet and dry air, typically in a ratio around 1/1. Upon temperature variation the rate of desorption seems to be dependent on the temperature up to an immeasurable difference is reached around 120° C. Here desorption occurs very rapidly and the SILP absorber is completely regenerated within a few minutes or shorter. A sorption cycle for the SILP materials corresponds to a cycle where the absorber first has been fully absorbed and then desorbed.

EXAMPLE 1

Reaction of NO and Water Over
1-Butyl-3-Methylimidazolium Nitrate in Presence of
Oxygen 1-Butyl-3-methylimidazolium nitrate 95% (Fluka) was used ([BMIM]NO$_3$). A thin liquid film was applied on the ATR diamond plate (Pike GladiATR) at room temperature and the sealed steel cap was placed on top of the sample. A flow of air saturated with water (8 mL/min) was passed over the sample and the first spectrum was recorded, see FIG. 7. A flow of 10 vol % NO in N$_2$ (AGA) was added to the gas flow, and spectra were continuously recorded using 8 scans on a Nicolet iS5 spectrometer (duration of 11 seconds) until steady state was obtained (see FIG. 7). The spectra were ATR corrected using OMNIC Lite software, assuming refractive index of 1.5. The spectra showed a rapid reaction consuming all water since the characteristic line at 3500 cm$^{-1}$ disappeared. Several new bands appeared. A comparison with the spectra of FIG. 2 clearly shows the formation of HNO$_3$. Especially the new bands around 1650 and 940 cm$^{-1}$ indicate the presence of HNO$_3$. The strong band around 1350 cm$^{-1}$ due to N—O stretching of the nitrate ion was partly split into new bands, due to new modes arising from strong hydrogen bonding with the nitric acid. After steady state was obtained the NO gas flow was discontinued and the sample was heated to 120° C. in situ in the air/water gas flow (8 mL/min) for 10 min. It can be clearly seen from FIG. 1 that the nitric acid was released and the [BMIM]NO$_3$ was fully recovered. The amount of nitric acid in the sample was determined through a deconvolution with Gaussian functions using the Systat software Peakfit 4.12. By constraining the width and position of the peaks used for deconvolution, the same procedure could be applied to the standard solutions shown in FIG. 8, and the concentration of HNO$_3$ was estimated to be around 1.05 mol/mol IL from the intensity of the peak at around 940 cm$^{-1}$. FIG. 7 shows ATR-FTIR spectra of [BMIM]NO$_3$ before and after reaction with a gas mixture of 10 vol % NO in nitrogen at a flow of 16 mL/min and air bubbled through water (8 mL/min). After the reaction had run until steady state the sample was heated to 120° C. under a flow of air/water (8 mL/min). FIG. 8 shows spectra of standard solutions of nitric acid in [BMIM]NO$_3$. The spectra correspond to 1.12 and 2.14 mol nitric acid per mol [BMIM]NO$_3$, respectively.

EXAMPLE 2

Reaction of NO and Water in
1-Butyl-3-Methylimidazolium Nitrate in Absence of
Oxygen A thin liquid film was applied on the ATR diamond plate at room temperature and the sealed steel cap was placed on top of the sample. A flow of 30 mL/min of argon saturated with water was passed over the sample and the first spectrum was recorded using 8 scans, see FIG. 9, The water flask had been degassed with argon for 30 min prior to the experiment to minimize the amount of oxygen. The sample was then exposed to 10 vol % NO in nitrogen (30 mL/min) for 10 min. The water signal at 3500 cm$^{-1}$ disappears but only negligible amounts of nitric acid were formed. The sample was again saturated with water from the argon/water gas flow for 1 min. Finally, the sample was again exposed to NO at a flow rate of 30 mL/min for 20 min. During the entire experiment only negligible amounts of nitric acid was observed. Comparison with Example 1 shows that oxygen or another oxidant is needed in order to oxidize NO to nitric acid. FIG. 9 shows [BMIM]NO$_3$ exposed to water by a stream of argon saturated with water. Then the flow was switched to 10 vol % NO in nitrogen for 30 min. After 10 min the gas flow was again switched to the Ar/water mixture for 1 min. Finally, the flow was changed back to 10 vol % NO in nitrogen for another 20 min.

EXAMPLE 3

Aerobic oxidation of NO in 1-butyl-2,3-dimethyl-midazolium nitrate

1-Butyl-2,3-dimethylimidazolium nitrate ([BDMIM]NO$_3$) was prepared by adding an equimolar amount of aqueous AgNO$_3$ to a solution of 1-butyl-2,3-dimethylimidazolium bromide in water. The precipitate was filtered off and the solvent removed by heating to 70° C. under reduced pressure. A thin film of the [BDMIM]NO$_3$ was placed on top of the heatable ATR diamond plate. The sealed stainless steel cap was applied on top of the sample. Initially the sample was heated to 120° C. while flushed with water saturated air (8 mL/min). After 10 min the sample was cooled to about room temperature (30° C.) still under water saturated air. A spectrum was obtained before exposure to NO, see FIG. 10. Afterwards, the sample was exposed to 16 mL/min 10 vol % NO in N$_2$ mixed with a flow of 8 mL/min water saturated air. Spectra were recorded using 8 scans. A selection of spectra is seen in FIG. 10. After 55 seconds almost all water had been consumed, and the spectrum had changed significantly. The intense band from nitrate N—O stretching at 1348 cm$^{-1}$ is initially broadened while new bands appear. This broadening combined with the bands at 1650 and 942 cm$^{-1}$ indicates the formation of significant amounts of nitric acid. After 4 min the samples had almost reached steady state, and the nitrate N—O stretching band at around 1350 cm$^{-1}$ is split into several new bands due to strong hydrogen bonding to the nitric acid.

The quantitative development of HNO$_3$ was monitored by deconvolution of the spectra followed by integration of the band at 942 cm$^{-1}$. The time resolved development of HNO$_3$ can be seen from FIG. 11. The initial reaction rate could be determined to 9.0*10$^{-3}$ s$^{-1}$.

EXAMPLE 4

Aerobic oxidation of NO in 1-Butyl-3-methyl-imidazolium chloride

The reactor was loaded with a thin film of [BMIM]Cl (98%, Aldrich) at room temperature analogous to the previous examples. Gas and flow conditions identical to Example 3 were used. Initially the IL film was saturated with water and a spectrum was recorded. The water content was estimated to around 9.5 wt, equivalent to a molar ratio of chloride:water of about 1 (extrapolation of a standard curve from 0.56, 1.6, 2.1, 4.3 wt % water in [BMIM]Cl determined by the mean value of three Karl Fisher titrations for each sample). Then the sample was exposed to the NO/O$_2$/H$_2$O mixture. Initially no formation of nitric acid was observed, but after 75 s it starts to form, see FIGS. 11 and 12. The rate of formation was determined to be 2.8*10$^{-3}$ s$^{-1}$ (see Table 2 and FIG. 11). The water is consumed rapidly during the experiment and after 3 min the water is almost gone and a new faster rate of formation of 9.3*10$^{-3}$ s$^{-1}$ is observed. This is very close to the rate observed using [BDMIM]NO$_3$. The reaction was run until steady state was observed. After steady state was achieved, the sample was heated to 120° C. under 8 mL/min air/water flow. After desorption of nitric acid very pure [BMIM]NO$_3$ was recovered as the final product (see FIG. 12).

The chloride ion is a strong Lewis base in the absence of water. This experiment indicates that the Lewis basicity and the identity of the anion could play an important role in the mechanism of aerobic oxidation of NO in ILs. The reaction changes mechanism and reaction rate after around 3 min into the experiment as nitrate and nitric acid is accumulated in the system and the water content decreases.

EXAMPLE 5

Aerobic oxidation of NO in 1-Ethyl-3-methylimidazolium triflate

A NO oxidation experiment analogous to Examples 3 and 4 was made with 1-ethyl-3-methylimidazolium triflate ([EMIM]OTf). After saturation with 8 mL/min air/water a spectrum was recorded and then 10 vol % NO in N$_2$ (16 mL/min) was added to the gas flow. The water was rapidly consumed and nitric acid was formed—see FIG. 13. In the previous examples the nitric acid evolution was estimated from integration of the band at around 940 cm$^{-1}$ in the difference spectra between the samples exposed to NO and the pure IL. In the case of [EMIM]OTf the area around 900 cm$^{-1}$ differed too much from that found in the spectra of the solutions of HNO$_3$ in [BMIM]NO$_3$ used as standards. Instead a point of reference was made from the nitric acid bands around 1650 cm$^{-1}$ from the steady state spectra where the background is more similar for [EMIM]OTf and [BMIM]NO$_3$. The value for the steady state concentration of HNO$_3$ in [BMIM]NO$_3$ estimated from the band around 1650 cm$^{-1}$ was therefore used to set a correct scale for the band around 940 cm$^{-1}$' which was then used to estimate the time resolved evolution of HNO$_3$ in [EMIM]OTf. Using this method, an estimated value of around 0.6 mol HNO$_3$/mol [EMIM]OTf at steady state was reached. Using this value, an initial reaction rate of 6.3*10$^{-3}$ s$^{-1}$ could be estimated (see Table 2 and FIG. 11). This example indicates that even a quite weak Lewis base such as the triflate ion, which is a much weaker base that the anions used in previous examples, could still be a suitable choice for an IL-based process converting nitrogen oxide into HNO$_3$. The rate and absorption capacity is comparable to the much stronger Lewis basic anions described in previous examples. Pure [EMIM]OTf could be recovered by desorbing the nitric acid by heating. [EMIM]NO$_3$ was not produced since nitric acid cannot protonate the triflate ion to make the much stronger triflic acid (see FIG. 13).

EXAMPLE 6

Aerobic oxidation of NO in 1-Butyl-3-methylimidazolium bis(trifluoromethylsulfonyl) imide The bis(trifluoromethylsulfonyl)imide (Tf$_2$N$^-$) anion is one of the weakest Lewis bases among the commonly used anions in ionic liquids. The NO oxidation experiment was performed analogous to examples 3-5. A very small amount of water could be observed in the sample before reaction (see FIG. 14). After NO exposure the sample reached steady state within a few minutes. Only a trace amount of nitric acid was observed in the IL and the concentration peaked after one minute. The steady state concentration was estimated to be 0.09 mol $HNO_3$/mol [BMIM]$Tf_2N$ using the same method of estimation as in Example 5. Due to the hydrophobic nature of this ionic liquid, the $HNO_3$ seemed to be in equilibrium with $NO_2$ in the form of $N_2O_4$. This could be detected from the characteristic band at around 1740 $cm^{-1}$. This example together with Example 5 demonstrates that even weaker Lewis basic anions like the $Tf_2N^-$ and $OTf^-$ anions are capable of catalyzing the conversion of NO into $HNO_3$ (see FIG. 14).

EXAMPLE 7

Aerobic oxidation of NO in Choline acetate

The NO oxidation experiment was performed analogous to previous examples using choline acetate (99%, Aldrich), see FIG. 15. As NO was added to the gas flow, the water was rapidly consumed in the reaction (the characteristic water line at 3400 $cm^{-1}$ disappears). As the nitric acid was produced it reacted simultaneously with the acetate present to produce acetic acid. These two compounds can be distinguished by their different C—O stretching modes. The acetic acid dimer is identified at 1720 $cm^{-1}$, whereas the deprotonated carboxylate group in acetate has a strong band at around 1570 $cm^{-1}$. The complex between the acid and the carboxylate has an intermediate mode located around 1650 $cm^{-1}$. No significant amount of nitric acid was observed in the first 3 min of the experiment, since no increase in the band around 940 $cm^{-1}$ was observed in this time interval (the band appearing around 1650 $cm^{-1}$ can be ascribed to $COO^-$ . . . HOOC modes). Instead the intensity loss of the band around 1570 $cm^{-1}$ was exploited analytically in this case. Using the spectrum recorded at 3 min as background, an initial reaction rate of $9.3*10^{-3} s^{-1}$ could be determined on the basis of the acetate C—O stretching (see FIG. 11 and Table 2).

At steady state the acetic acid has desorbed from the ionic liquid film since none of the characteristic lines for acetate or acetic acid can be found anymore. The remaining IL film consisted of a mixture of choline nitrate and nitric acid as can be seen from comparison with FIG. 16.

The reaction rate is identical to the one obtained with the [BMIM]Cl and [BMIM]$NO_3$ in previous examples 2 and 4, which indicates that the structure of the IL cation does not play an important role in the mechanism from a kinetic point of view.

Upon heating to 120° C. in moist air, $HNO_3$ was desorbed and pure choline nitrate could be isolated (see FIG. 15).

The resulting choline nitrate was cooled to room temperature in the air/water flow. Then it was exposed to the $NO/O_2/H_2O$ mixture analogous to previous examples, see FIG. 16. The reaction was followed until steady state. It was not possible to quantify the amount of $HNO_3$ during reaction or at steady state by analysis of the IR spectra in a manner analogous to the previous examples, due to strong overlap with the modes from the choline ion at 940 $cm^{-1}$. A rough estimate would put the nitric acid concentration above 1 mol/mol IL. The difference of the choline ion relative to the imidazolium ions is that the former contains a hydrophilic alcohol group that could be able to bind more $HNO_3$, than what is bound in the complex with the nitrate ion (see FIG. 16). This result indicates that the structure of the cation have an influence on the $HNO_3$ storage capacity of the liquid ionic composition.

EXAMPLE 8

Aerobic oxidation of NO in 1,1,3,3-tetramethylguanidinium chloride 1,1,3,-tetramethylguanidinium chloride ([TMGH]Cl) is a hygroscopic salt that melts around 200° C. in the absence of water. In the presence of water it forms a melt at room temperature. The salt was prepared by neutralization of 1,1,3,3-tetramethylguanidine with aqueous HCl. The solvent was removed and the product was recrystallized in ethanol. The sample used was in equilibrium with the atmosphere when it was loaded into the instrument analogous to previous examples. Before adding NO to the gas flow, the sample was given further time to equilibrate with the moisture from the air/water mixture. When NO was added to the flow it was observed, that water was consumed while the intensity of the bands in the areas around 1650 and 940 $cm^{-1}$ started to increase. Due to overlap with N—H bending of the $NH_2$ group on the [TMGH]$^+$ ion it was not possible to follow the reaction.

A further complication for this IL is the protonation of the amine groups by the produced nitric acid. The resulting tertiary ammonium groups could be identified from the N—H stretching appearing around 3050-3100 $cm^{-1}$. After 6 min some decomposition of the protonated [TMGH]$^+$ could be observed, which indicates that the 1,1,3,3-tetramethylguanidinium ion is not entirely stable at high concentrations of nitric acid. The sample approached steady state after 20 min.

After steady state the NO was removed from the flow and the sample was heated to 120° C. Clear indications of nitrate now appeared around 1350 $cm^{-1}$. The sample lost water and suddenly crystallized at 120° C. resulting in poor contact with the ATR diamond. To generate a comparable spectrum, the sample was heated to 200° C. where the anhydrous form melts again. Characteristic features of the both the nitrate (N—O stretching 1350 $cm^{-1}$) and [TMGH]$^+$ ion (primary amine 3250 and 3410 $cm^{-1}$) were observed (see FIG. 17).

TABLE 2

Rate constants for $HNO_3$ formation and concentration in the employed ionic liquids. The empty spaces indicate that a quantitative estimate was not possible from the standard solution shown in FIG. 8 Nitrate and chloride-based ionic liquids seem to have the highest storage capacity for $HNO_3$.

| Ionic liquid | rate constant for $HNO_3$ formation | Mol $HNO_3$/mol IL at steady state |
|---|---|---|
| [BMIM]$NO_3$ | — | 1.05 |
| [BDMIM]$NO_3$ | $9.0*10^{-3} s^{-1}$ | 1.09 |
| [EMIM]OTf | $6.3*10^{-3} s^{-1}$ | 0.59 |
| [BMIM]$Tf_2N$ | — | 0.09 |
| [BMIM]Cl | $9.3*10^{-3} s^{-1}$(a) | 1.05 |
| [TMGH]Cl•$xH_2O$ | — | — |
| Choline acetate | $9.3*10^{-3} s^{-1}$ | — |
| Choline $NO_3$ | — | 1-2[b] |

(a)For [BMIM]Cl two rate constants were observed. The rate constant observed between 1 and 3 min exposure was $2.8*0^{-3} s^{-1}$ and the final was $9.3*0^{-3} s^{-1}$.
[b]The concentration of $HNO_3$ in choline nitrate could not be measured accurately by the IR method used in the other examples, but is estimated to be between 1-2 mol $HNO_3$/mol ionic liquid at steady state.

EXAMPLE 9

SILP Absorbers Prepared on Calcined Silica, Carbon and Anatase Support Materials Correlating the $NO_2$ and NO Concentrations After experiments with the uncalcined silica SILP, it became apparent that a correlation between the NO and $NO_2$ concentrations had to be established, the results are found in FIGS. 21-23. In order to establish this correlation, a gas bottle of $NO_2$ in nitrogen was procured (1000 ppm±2%, AGA), and a spectrum was recorded at a concentration of 1000 ppm $NO_2$. The spectrum shown in FIG. 19 was obtained after flushing the system for 20 min at a flow rate of 100 ml/min.

When comparing the spectrum for pure $NO_2$ to the spectra shown in FIG. 24, it seems evident that the broad band in the spectral range used is not directly quantifiable for $NO_2$. Accordingly, another method to determine the correlation between NO and $NO_2$ was needed. The correlation was determined by closing the nitrogen balance, assuming that only the two species NO and $NO_2$ are in the gas mixture when the reactor is bypassed. This is deemed a fair assumption since it is unlikely that other species than $NO_2$ will be formed. The only other species one could imagine is the dimers $N_2O_2$ and $N_2O_4$. However both of these species are highly unfavorable at elevated temperatures, and since the cuvette is heated to 100° C., there will be little, if any of these species left.

$NO_2$ is the thermodynamically favored species, which means that the $NO_2$ concentration is partially a function of the total residence time of the gas. With this in mind, spectra were obtained at flow rates of 50 and 150 ml/min; these spectra are shown in FIG. 20. As can be seen from the spectra, the concentration of $NO_2$ in the spectrum obtained at 150 ml/min is essentially zero.

Using the NO concentration at 150 ml/min as the baseline, the correlation between the two gases could be determined. This was done by calculating the area of the NO peak, at both 50 and 150 ml/min. The average area from ten measurements at each flow rate was used to determine the ratio between the NO concentrations at the different flow rates. The results are shown in Table 3.

TABLE 3

Data used for determining the correlation between NO and $NO_2$

| Flow rates (ml/min) | Average area | Correlated (vppm) | Ratio ($c/c_0$) |
| --- | --- | --- | --- |
| 50 | 0.1086 | 1885 | 0.942 |
| 150 | 0.1152 | 2000 | |

From these results and using the aforementioned assumptions, it follows that the concentration of $NO_2$ when bypassing the reactor at 50 ml/min is around 115 vppm.

Uncalcined Silica

The SILP absorber prepared with uncalcined silica was the first material tested. A total of 5.0 g of the uncalcined material, corresponding to 1.5 g of IL, was placed in the reactor and tested at different water concentrations of 2500, 1800 and 900 vppm of water. The most promising result was shown with 900 vppm of water; a time resolved spectrum of the results from this experiment is shown in FIG. 21.

As is evident from FIG. 21, a very small amount of NO is absorbed in the initial phase. A good selectivity towards $NO_2$ is, however, found removing all for a significant amount of time. The initial phase is the initial part of the NO absorption, typically lasting 5-10 minutes, in which the NO signal either disappears or is significantly lowered. The time in which there is no NO signal is referred to as dead signal time.

Numerous different ways for absorbing and desorbing was tested without any real breakthrough in absorption performance. Common for all these different configurations were, that desorption was carried out in a stream with no less than 900 vppm of water and typically with either 1800 or 2500 vppm.

The breakthrough in SILP absorber performance occurred, when the SILP was dried after desorption for 1 hour in a 150 ml/min stream of dry air during cooling. When desorption was performed like this in a gas stream with a composition of 900 vppm wet air and 2000 vppm after prior absorption at 40° C. the results shown in FIGS. 22 and 23 were obtained.

These results proved that it was possible to get a completely dead signal for the quantifiable NO peak. As can be seen from FIG. 23, all NOx is removed from the simulated flue gas for 6.5 min. However, this experiment had the unwanted side effect that a very high amount of $NO_2$ was formed after the initial reaction removing all NOx and unfortunately the $NO_2$ concentration is not directly quantifiable from the spectral data obtained. The results shown in FIGS. 22 and 23 were obtained in the 15th cycle with the uncalcined silica SILP absorber. Importantly, they indicate no apparent drop in the absorption capacity for the SILP absorber when reused.

Calcined Silica SILP

Experiments with calcined silica SILP absorbers were conducted in two series. For the first 2.5 g SILP absorber was used, corresponding to 0.8 g of IL. For the second series of testing a total of 4.8 g SILP was used, corresponding to 1.5 g of IL.

The first 15 experiments were conducted using a flue gas stream with 800 vppm NO and varying water concentration. All of these experiments showed low NOx removal. It was discovered later that it was not possible to obtain the desired water concentration in the gas stream due to the wet air flow being too low. The results were accordingly discarded, but the experiments functioned well as a way to cycle the SILP, so it provided valuable information nonetheless. The rest of the experiments have been conducted with a NO concentration of 2000 vppm.

An experiment was made to recreate the results obtained with the uncalcined silica SILP absorber. This was possible but as for the uncalcined silica a large amount of $NO_2$ was formed giving spectra resembling the ones in FIG. 22.

Several different gas compositions were tested, both during absorption and desorption. Also the desorption temperature was altered, while the absorption temperature was kept constant at room temperature. The main gas composition for absorption had a NO concentration of 2000 vppm and a water concentration just below the stoichiometric value, namely at 900 vppm. The desorption stream generally contained 900 vppm of water, or lower, with no NO present. The flow rate was kept at 50 ml/min for absorption and 150 ml/min for desorption.

In these experiments, satisfying results were only obtained when the water concentration for both desorption and absorption was increased significantly. Thus, a water concentration for desorption of 5000 vppm and 1500 vppm for absorption yielded the results shown in FIGS. 24 and 25 at room temperature. This experiment was the 27th overall cycle for the calcined silica SILP absorber.

From FIGS. 24 and 25 it is clear that the NO concentration shown in FIG. 25 is not in direct correlation with the amount of NOx removed from the inlet gas stream. An unknown NOx species appears in the spectrum as a broad band with a peak below 200 nm. This suggests that a form of NOx, different from NO and $NO_2$, is stabilized on the calcined silica support by the way the experiment is conducted. Given that the peak is somewhat quantifiable, the amount formed of this type of NOx seems significantly smaller than the amount of $NO_2$ formed when using the uncalcined silica SILP absorber.

In an attempt to further increase the absorption of NO in the SILP, the water concentration in the absorption stream was increased further to 2500 and 5000 vppm. This induces no significant change in the results, suggesting that the water is not an inhibitor or at least to a very small extends, towards absorption.

However, the water may be a delimiter if the concentration is too low. With somewhat optimal concentrations of NO and water determined, an attempt was made to determine the optimal temperature. Experiments for both absorption and desorption were conducted under the same conditions that yielded the results shown in FIGS. 24 and 25, by varying the temperature in intervals from 10 to 40° C. The development of the calculated NO concentrations at the different temperatures are shown in FIG. 26.

As is evident from FIG. 26 the optimal temperature seems to be around 40° C. The experiment conducted at 40° C. was the 30th cycle for the SILP material confirming, that there is no evident drop in capacity during repeatedly use.

The last experiments conducted with the calcined silica SILP absorber explored the development of the gas stream, when the SILP material was exposed to this for a longer period of time. After initializing the experiment by three consecutive sorption cycles, the SILP was exposed to a gas mixture with the optimal composition of water and NO for a total of 23.5 hours. After running the first experiment, desorption was conducted in a stream with the same composition as the absorption, including NO. Desorption occurred at 120° C. The results are shown in FIGS. 27 and 28.

Again the spectral data for the calcined SILP shows formation of the unknown NOx species. Hence, this unwanted side reaction seems to be repressed by desorbing directly in the gas stream. Desorbing in the gas mixture seems, however, to decrease the amount of NOx that is removed in the initial reaction giving rise to a much shorter period of complete NOx removal.

Carbon SILP

Carbon is well known for its high surface area and was therefore expected to provide SILP absorbers with the highest BET surface area. For the sorption experiments the reactor was packed with 6.0 g of carbon SILP absorber, corresponding to the second largest amount of IL used (1.1 g) in any of the experiments. Due to the hydrophobic nature of the pure carbon, the water concentration was raised to 4000 vppm yielding the results shown in FIG. 29.

As can be seen from the spectral data, the carbon SILP seems to promote formation of the unknown NOx species, especially in the beginning of the experiment. This promotion effect decreased, however, and the SILP seems to absorb an increasing amount of NO after prolonged time. In order to prevent the promotion the water concentration in the gas stream was increased. The best results were obtained in a gas stream, which was fully saturated with water; these results are shown in FIGS. 30 and 31. However, these results were not as good as for the calcined silica SILP absorber, demonstrating that the absorber efficiency is not only governed by a combination of high surface area and low surface acidity.

Anatase SILP

The first experiments conducted used some of the same configurations as tried both with the silica and carbon SILP materials. Thus water concentrations below 1500 vppm were not tested and the NO remained constant at 2000 vppm.

The total mass of the used SILP absorber was 10 g, but the relative low pore volume still makes it the SILP with the least amount of contained IL (1 g) and the relative high density of anatase made the reactor bed volume comparable to that of the other supports.

The best immediate absorption results were obtained under the same conditions as for the silica SILP materials, but the water concentration seemed to have little or no impact on the results. FIGS. 32 and 33 show the results obtained at 40° C. with a water concentration of 1500 vppm. This was results obtained from the 6th overall cycle for the anatase SILP.

As is evident from the collected data, the dead signal time is the highest achieved of the examined SILP absorbers. However, as with the other supports (apart from the uncalcined silica) also anatase seems to stabilize the unknown NOx species.

In order to clarify what happens during desorption experiments were conducted where the SILP material was fully desorbed at 120° C. in a gas stream of atmospheric air with a water concentration of 1500 vppm. After desorption NO was added to the inlet gas, and it was passed through the reactor at different temperatures. After each experiment, the reactor was then desorbed at 120° C. in a gas stream without NO. This was done at the four different set temperatures 120, 110, 100 and 90° C. The temperatures measured just above the SILP bed was 103, 95, 88 and 80° C., respectively. The results of these experiments can be seen in FIGS. 34 and 35.

From the data it appears as if the unknown NOx species is destabilized at elevated temperatures. This may suggest that it is a dimer or possibly a protonated species. As expected, the amount of NO absorbed decreases with temperature. Surprisingly, however, a significant amount of NO is absorbed even at temperatures above 80° C. This may suggest that the NO bonding in the SILP material is stronger than the bonding in the pure IL, where complete desorption occurs at 80° C.

The concentration of $NO_2$ continues to increase at 110 and 120° C. This suggests that some conversion is still taking place at the surface of the SILP at these temperatures. Possibly this can also explain the observed drop in NO concentration immediately after the gas stream enters the reactor, since this is when the available amount of reaction sites is the highest.

The anatase SILP was also tested in two 24-hour absorption experiments. These experiments were carried out with a water concentration during absorption of 2000 vppm and a concentration of 5000 vppm during desorption. The experiments were conducted at sorption cycle number 16 and 17 for the anatase SILP, respectively. In the first experiment, the SILP was desorbed in a gas containing NO, while no NO was present during desorption in the second experiment. Desorption was conducted at an oven setting of 140° C. giving a measured temperature above the SILP bed of 120° C. The results are shown in FIGS. 36 and 38.

According to the results the anatase SILP does not seem to be effected negatively by desorption in a gas stream containing NO. Actually, the amount of $NO_2$ formed during absorption is lower for the SILP desorbed in NO, at least during the first 2 hours or so. Also noticeably, the anatase SILP does not seem to promote formation of the unknown NOx species at this water concentration.

In-Situ ATR-FTIR Experiments with $D_2O$

The in-situ ATR-FTIR experiments were used to determine the source of the hydrogen atoms involved in forming the nitric acid.

The absorption was conducted by passing a gas stream with a composition of 2000 vppm NO and 2000 vppm $D_2O$ over the silica SILP at a constant temperature of 30° C. In-situ IR-spectra were continuously recorded over a 12 hour span, and the results are shown in FIG. 38.

It is evident from FIG. 38, that there is a definite rise in the concentration of $DNO_3$ while there is a decrease in the concentration of the free nitrate ion in the SILP material. This supports that water from the air is used in the formation of the nitric acid in the SILP. The decrease in the concentration of free nitrate further suggests that the nitrate present in the SILP prior to absorption coordinates with the nitrate that is formed during absorption.

The invention claimed is:

1. A method for capturing nitric oxide (NO) from gasses containing more than one gaseous compound, comprising:
   a. absorbing said NO in a liquid ionic composition in the presence of oxygen and water, and
   b. reacting the absorbed NO with oxygen and water to form nitric acid which accumulates in the liquid ionic composition, wherein said liquid ionic composition comprises one or more ionic compounds.

2. The method according to claim 1 wherein the liquid ionic composition comprises one or more organic cations selected from:

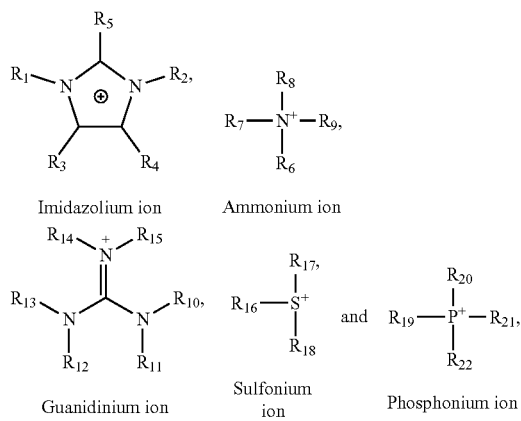

Imidazolium ion    Ammonium ion

Guanidinium ion    Sulfonium ion    Phosphonium ion wherein
$R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, $R_{16}$, $R_{17}$, $R_{18}$, $R_{19}$, $R_{20}$, $R_{21}$ and $R_{22}$ can be, independently, hydrogen, alkyl, halogenated alkyl, aminoalkyl, hydroxyalkyl, alkoxyalkyl, alkenyl, alkynyl, aryl, heteroaryl, cycloalkyl, cycloalkenyl, heterocycloalkyl, or heterocycloalkenyl;

the positively charged P, N and S atoms may individually be part of heterocyclic or heteroaromatic structures by:
   fusing two of $R_{19}$ $R_{20}$, $R_{21}$, and $R_{22}$ to form a cyclic phosphonium ion, or
   fusing two of $R_6$ $R_7$, $R_8$, and $R_9$ to form a cyclic ammonium ion, or
   fusing two of $R_{11}$, and $R_{12}$, or $R_{13}$ and $R_{14}$, or $R_{15}$ and $R_{10}$ to form a cyclic guanidinium ion, or
   fusing two of $R_{16}$, $R_{17}$ and $R_{18}$ to form a cyclic sulfonium ion, and one or more anions selected from $C_1$-$C_6$ alkanoates, arylcarboxylates, $C_1$-$C_6$ alkylsulfates, $C_1$-$C_6$ alkylsulfonates, $C_1$-$C_6$ perfluoroalkylsulfonates, $C_1$-$C_6$ perfluoroalkanoates, $C_1$-$C_6$ perfluoroalkylsulfonimides, tetrafluoroborate, hexafluorophosphate, sulfate, nitrate and halides.

3. The method according to claim 1 wherein the liquid ionic composition comprises a cation having the following structure:

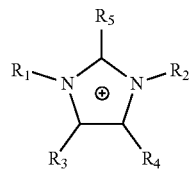

Imidazolium ion wherein $R_1$ and $R_2$ are individually selected from $C_1$-$C_8$ alkyl groups or aryl groups, and wherein $R_3$, $R_4$ and $R_5$ are individually selected from hydrogens, $C_1$-$C_6$ alkyl groups or aryl groups or wherein $R_3$ and $R_4$ together with the imidazolium group may form a 4- to 6-membered saturated, unsaturated or aromatic ring, which may further contain up to three hetero atoms selected from oxygen, nitrogen and phosphorus.

4. The method according to claim 1 wherein said ionic composition comprises one or more ionic compounds selected from 1-ethyl-3-methylimidazolium ([EMIM]$^+$) acetate, 1-butyl-3-methylimidazolium ([BMIM]$^+$) acetate, 1-ethyl-3-methylimidazolium ([EMIM]$^+$) triflate, 1-butyl-3-methylimidazolium ([BMIM]$^+$) triflate, 1-ethyl-3-methylimidazolium ([EMIM]$^+$) nitrate, 1-butyl-3-methylimidazolium ([BMIM]$^+$) nitrate, 1-butyl-2,3-dimethylimidazolium ([BDMIM]$^+$) nitrate, choline chloride, choline acetate and 1,1,3,3-tetramethylguanidinium chloride.

5. The method according to claim 1, wherein the liquid ionic composition further comprises one or more cations selected from Li$^+$, Na$^+$ and K$^+$.

6. The method according to claim 1, wherein the liquid ionic composition further comprises a non-ionic solvent.

7. The method according to claim 1, wherein the liquid ionic composition is absorbed in a porous carrier and used in the form of a supported ionic liquid phase (SILP) material.

8. The method according to claim 7 wherein the porous carrier material is selected from $SiO_2$, $Al_2O_3$, $TiO_2$, $CeO_2$, $ZrO_2$, or carbon, or a combination thereof.

9. The method according to claim 7 wherein the porous carrier material is anatase $TiO_2$.

10. A method according to claim 8, wherein the porous carrier material is anatase $TiO_2$.

11. A method according to claim 8, wherein the porous carrier material is calcined $SiO_2$.

12. The method according to claim 1, wherein the nitric acid is desorbed from said liquid ionic composition by increasing the temperature and increasing the flow rate.

13. The method of claim 1, wherein said gasses are flue gases.

14. The method of claim 1, which further comprises:
   c. removing the formed nitric acid from the liquid ionic composition solution by increasing the temperature and/or decreasing the pressure.

15. The method according to claim 1, wherein the liquid ionic composition comprises one or more organic cations selected from:

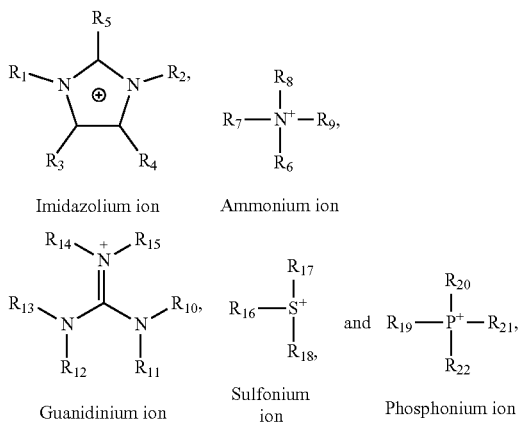

wherein $R_1, R_2, R_3, R_4, R_5, R_6, R_7, R_8, R_9, R_{10}, R_{11}, R_{12}, R_{13}, R_{14}, R_{15}, R_{16}, R_{17}, R_{18}, R_{19}, R_{20}, R_{21}$ and $R_{22}$ can be, independently, hydrogen, alkyl, halogenated alkyl, aminoalkyl, hydroxyalkyl, alkoxyalkyl, alkenyl, alkynyl, aryl, heteroaryl, cycloalkyl, cycloalkenyl, heterocycloalkyl, or heterocycloalkenyl;

the positively charged P, N and S atoms may individually be part of heterocyclic or heteroaromatic structures by:
fusing two of $R_{19}$ $R_{20}$, $R_{21}$ and $R_{22}$ to form a cyclic phosphonium ion, or
fusing two of $R_6$, $R_7$, $R_8$, and $R_9$ to form a cyclic ammonium ion, or
fusing two of $R_{11}$ and $R_{12}$, or $R_{13}$ and $R_{14}$, or $R_{15}$ and $R_{10}$ to form a cyclic guanidinium ion, or
fusing two of $R_{16}$, $R_{17}$ and $R_{18}$ to form a cyclic sulfonium ion.

16. The method according to claim 1, wherein the liquid ionic composition comprises one or more anions selected from $C_1$-$C_6$ alkanoates, arylcarboxylates, $C_1$-$C_6$ alkylsulfates, $C_1$-$C_6$ alkylsulfonates, $C_1$-$C_6$ perfluoroalkylsulfonates, $C_1$-$C_6$ perfluoroalkanoates, $C_1$-$C_6$ perfluoroalkylsulfonimides, tetrafluoroborate, hexafluorophosphate, sulfate, nitrate and halides.

17. The method of claim 1, wherein the liquid ionic composition comprises one or more anions selected from nitrate and chloride.

18. A method of producing nitric acid ($HNO_3$) from nitric oxide (NO), comprising absorbing said nitric oxide in a liquid ionic composition in the presence of oxygen and water, wherein said nitric oxide is converted into nitric acid.

19. A method for the preparation of an anhydrous nitric acid solution of nitric acid ($HNO_3$) in a liquid ionic composition, comprising absorbing NO and/or $NO_2$ in said liquid ionic composition followed by conversion to $HNO_3$.

* * * * *